US012679660B2

(12) United States Patent
Kotani et al.

(10) Patent No.: US 12,679,660 B2
(45) Date of Patent: Jul. 14, 2026

(54) TRANSPORT CARRIAGE

(71) Applicant: DISCO CORPORATION, Tokyo (JP)

(72) Inventors: Masaya Kotani, Tokyo (JP); Tsuyoshi Nakashima, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 18/743,465

(22) Filed: Jun. 14, 2024

(65) Prior Publication Data

US 2025/0011098 A1 Jan. 9, 2025

(30) Foreign Application Priority Data

Jul. 7, 2023 (JP) ................................. 2023-111960

(51) Int. Cl.
B65G 25/06 (2006.01)

(52) U.S. Cl.
CPC ...... B65G 25/06 (2013.01); B65G 2201/0297 (2013.01)

(58) Field of Classification Search
None
See application file for complete search history.

(56) References Cited

U.S. PATENT DOCUMENTS

| | | | | | |
|---|---|---|---|---|---|
| 5,388,945 | A | * | 2/1995 | Garric | H01L 21/67769 414/416.03 |
| 5,868,545 | A | * | 2/1999 | Kasai | B65G 65/00 414/331.15 |

| | | | | | |
|---|---|---|---|---|---|
| 6,390,754 | B2 | * | 5/2002 | Yamaga | H01L 21/67259 414/217 |
| 6,663,340 | B1 | * | 12/2003 | Zeakes | H01L 21/67769 414/935 |
| 6,726,429 | B2 | * | 4/2004 | Sackett | H01L 21/67769 414/331.14 |
| 6,851,913 | B2 | * | 2/2005 | Iizuka | H01L 21/67727 414/940 |
| 7,780,020 | B2 | * | 8/2010 | Yoshitaka | H01L 21/67733 414/940 |
| 7,796,049 | B2 | * | 9/2010 | Ito | B65G 1/1371 340/673 |
| 7,887,278 | B2 | * | 2/2011 | Hoshino | H01L 21/67775 414/940 |
| 8,086,341 | B2 | * | 12/2011 | Spangler | G05B 19/41815 700/229 |
| 8,105,005 | B2 | * | 1/2012 | Yoshida | B65G 47/61 414/940 |
| 8,287,222 | B2 | * | 10/2012 | Sawado | H01L 21/67775 700/228 |
| 8,726,811 | B2 | * | 5/2014 | Kobayashi | H01L 21/67733 414/282 |
| 9,086,697 | B2 | * | 7/2015 | Suzuki | H01L 21/6773 |

(Continued)

FOREIGN PATENT DOCUMENTS

JP 2020161578 A 10/2020

*Primary Examiner* — Joseph A Dillon, Jr.
(74) *Attorney, Agent, or Firm* — Greer, Burns & Crain, Ltd

(57) ABSTRACT

A transport carriage for transporting a workpiece by traveling on a transport passageway installed over a processing apparatus includes a receptacle for housing the workpiece, a storage area for storing the receptacle, a lifting and lowering unit for lifting and lowering the receptacle between the storage area and the processing apparatus, and a determining unit for determining whether the workpiece is housed in the receptacle or not.

6 Claims, 11 Drawing Sheets

(56)                References Cited

U.S. PATENT DOCUMENTS

|  |  |  |  |  |
|---|---|---|---|---|
| 9,520,313 | B2 * | 12/2016 | Ota | H01L 21/67769 |
| 9,633,881 | B2 * | 4/2017 | Rebstock | H01L 21/67276 |
| 9,881,824 | B2 * | 1/2018 | Ito | H01L 21/67733 |
| 9,975,705 | B2 * | 5/2018 | Kinugawa | H01L 21/67727 |
| 10,083,847 | B2 * | 9/2018 | Tomida | H01L 21/67259 |
| 10,170,379 | B2 * | 1/2019 | Sekiya | H01L 21/67115 |
| 10,622,236 | B2 * | 4/2020 | Kuo | H01L 21/683 |
| 10,717,605 | B2 * | 7/2020 | Sekiya | H01L 21/6773 |
| 10,964,571 | B2 * | 3/2021 | Sekiya | B65G 1/0492 |
| 10,964,572 | B2 * | 3/2021 | Sekiya | H01L 21/67092 |
| 10,974,359 | B2 * | 4/2021 | Sekiya | B23Q 15/22 |
| 11,059,673 | B2 * | 7/2021 | Sekiya | H01L 21/6773 |
| 11,365,062 | B2 * | 6/2022 | Ohkawara | B65G 47/905 |
| 11,370,106 | B2 * | 6/2022 | Stehr | B25J 15/0253 |
| 11,807,500 | B2 * | 11/2023 | Kultanen | B66C 11/04 |
| 11,848,221 | B2 * | 12/2023 | Chiu | H01L 21/677 |
| 12,139,377 | B2 * | 11/2024 | Abe | H01L 21/67288 |
| 12,300,544 | B2 * | 5/2025 | Zhao | H01L 21/67132 |
| 2005/0079041 | A1 * | 4/2005 | Campbell | H01L 21/6773 |
|  |  |  |  | 414/626 |

| 2007/0157878 | A1 * | 7/2007 | Aoki | H01L 21/67736 |
|---|---|---|---|---|
|  |  |  |  | 700/218 |
| 2008/0219825 | A1 * | 9/2008 | Yoshida | B65G 47/61 |
|  |  |  |  | 414/749.6 |
| 2009/0067957 | A1 * | 3/2009 | Ando | H01L 21/67775 |
|  |  |  |  | 414/222.05 |
| 2009/0196715 | A1 * | 8/2009 | Rebstock | H01L 21/67769 |
|  |  |  |  | 414/222.01 |
| 2015/0045937 | A1 * | 2/2015 | Yamamoto | H01L 21/67294 |
|  |  |  |  | 700/121 |
| 2015/0336280 | A1 * | 11/2015 | Usami | H01L 21/67733 |
|  |  |  |  | 294/67.33 |
| 2015/0340253 | A1 * | 11/2015 | Oosterlaken | H01L 21/67736 |
|  |  |  |  | 414/172 |
| 2017/0278736 | A1 * | 9/2017 | Iwasaki | H01L 21/67736 |
| 2018/0358252 | A1 * | 12/2018 | Honda | H01L 21/67724 |
| 2019/0352099 | A1 * | 11/2019 | Sekiya | H01L 21/67092 |
| 2020/0312688 | A1 * | 10/2020 | Sekiya | H01L 21/67736 |
| 2020/0343111 | A1 * | 10/2020 | Sekiya | H01L 21/67092 |
| 2021/0024294 | A1 * | 1/2021 | Sekiya | H01L 21/67733 |

* cited by examiner

TRANSPORT CARRIAGE

BACKGROUND OF THE INVENTION

Field of the Invention

The present invention relates to a transport carriage for transporting workpieces.

Description of the Related Art

Wafers with a plurality of devices constructed thereon are divided or segmented into pieces referred to as device chips that include the devices, respectively. A packaged substrate is fabricated by mounting a plurality of device chips on a given substrate and covering or encapsulating the mounted device chips with a resin layer, i.e., a layer of molded resin. The packaged substrate is then divided or segmented into packaged devices that include packaged device chips, respectively. The device chips and the packaged devices will be incorporated into various electronic appliances such as cellular phones and personal computers, for example.

Workpieces such as wafers and packaged substrates are processed by various processing apparatuses including cutting apparatuses, grinding apparatuses, polishing apparatuses, and laser processing apparatuses. For processing workpieces on a processing apparatus, an operator carries a cassette that houses a plurality of workpieces therein to the processing apparatus. When the cassette is set on the processing apparatus, the processing apparatus takes out workpieces one by one from the cassette and processes the workpieces successively.

In recent years, there has been proposed a transport system for automatically transporting workpieces to processing apparatuses. For example, JP 2020-161578A discloses a process of transporting workpieces with transport carriages that run on a transport path disposed over a plurality of processing apparatuses. The transport carriages travel while housing workpieces therein to carry the workpieces to given processing apparatuses at particular times. The disclosed process automatically transports workpieces to processing apparatuses, thereby increasing the efficiency of transporting operation.

SUMMARY OF THE INVENTION

While workpieces are being transported by transport carriages of a transport system, each of the transport carriages is electrically connected by a wired or wireless link to a controller or a control apparatus of the transport system, which manages operation of the transport carriages. For example, the controller monitors the way in which the transport carriages are transporting workpieces, referred to as transporting details of the transport carriages, e.g., the positions of the transport carriages, whether each of the transport carriages is transporting workpieces or standing by, and which transport carriage is transporting what workpieces, and outputs commands or control signals to the transport carriages. In this manner, the workpieces can automatically be transported and transferred efficiently.

However, while the transport carriages are in operation, the transporting details of the transport carriages as they are recognized by the controller and the actual transporting details of the transport carriages may become unintentionally different from each other. For example, in the event of an anomaly of a processing apparatus or a transport carriage while workpieces are being transported, an error is reported, bringing the transport carriages to an emergency shutdown, and the transport system is inspected. At this time, depending on the nature of the error, workpieces carried by transport carriages that being stopped are removed and examined by the operator. If the operator forgets to return the workpieces to the transport carriages after the examination and the transport system resumes its operation, then the examined workpieces are not actually carried by the transport carriages though the controller still recognizes that the workpieces are carried by the transport carriages.

If the transporting details of the transport carriages are misrecognized, as described above, then workpieces may not be transported to desired locations at desired times, and hence smooth transporting operation may be disrupted. For example, it is assumed that it is found for the first time that no workpiece has been carried by a transport carriage when the transport carriage has arrived at a processing apparatus as a destination and is to transfer a workpiece to the processing apparatus. At this time, an error may be announced. In such a situation, the transport carriage needs to transport a workpiece again after having already finished its travel in vain to the processing apparatus, resulting in a resetting of the transport schedule and a loss of transport time due to the transport carriage required to transport the workpiece again. When the transporting details of the transport carriages as they are recognized by the controller and the actual transporting details of the transport carriages become unintentionally different from each other, as described above, the efficiency with which to transport workpieces with the transport carriages is lowered, possibly delaying the process of processing the workpieces with the processing apparatuses.

The present invention has been made in view of the above difficulties. It is an object of the present invention to provide a transport carriage that is capable of preventing the efficiency with which to transport workpieces with the transport carriage from being lowered.

In accordance with an aspect of the present invention, there is provided a transport carriage for transporting a workpiece by traveling on a transport passageway installed over a processing apparatus, including a receptacle for housing the workpiece, a storage area for storing the receptacle, a lifting and lowering unit for lifting and lowering the receptacle between the storage area and the processing apparatus, and a determining unit for determining whether the workpiece is housed in the receptacle or not.

Preferably, the determining unit includes a non-contact-type sensor for detecting the workpiece through the receptacle. Preferably, the lifting and lowering unit includes a suspending member connected to the receptacle for suspending the receptacle, a rotatable reel with the suspending member wound therearound, and an electric motor for controlling rotation of the reel, and the determining unit for determining whether the workpiece is housed in the receptacle or not on the basis of torque of the electric motor.

Further preferably, an individual identification tag representing individual information of the workpiece is attached to the workpiece, and the determining unit reads the individual information from the individual identification tag.

The transport carriage according to the aspect of the present invention has a function to determine of its own accord whether a workpiece is housed in the receptacle carried on the transport carriage or not. The function makes it able to avoid continuing to transport a workpiece while the workpiece housing state of the receptacle is not appropriate, thereby preventing the efficiency with which to transport workpieces from being lowered.

The above and other objects, features and advantages of the present invention and the manner of realizing them will become more apparent, and the invention itself will best be understood from a study of the following description and appended claims with reference to the attached drawings showing preferred embodiment of the invention.

DETAILED DESCRIPTION OF THE PREFERRED EMBODIMENT

Figure 1:
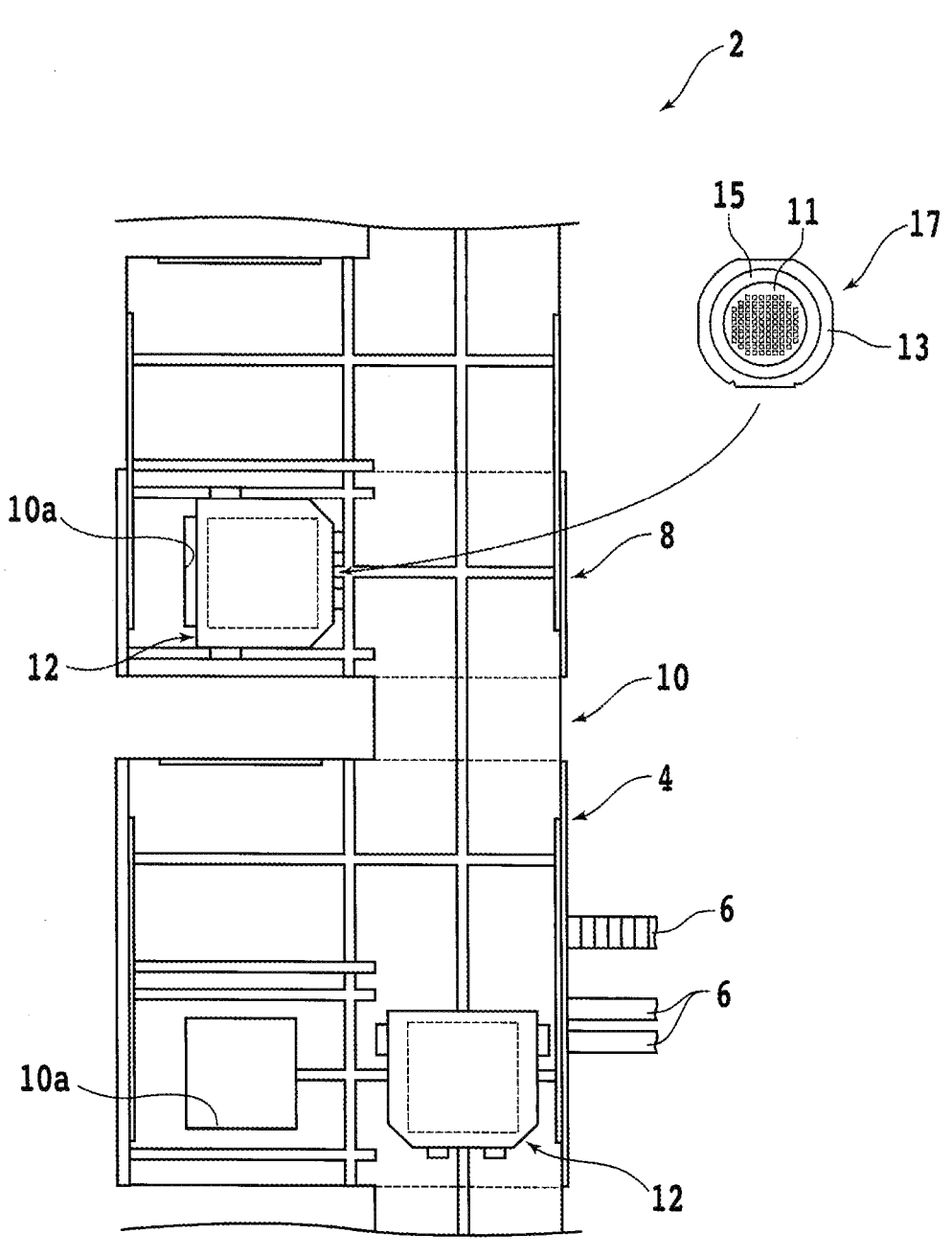
FIG. 1 is a plan view of a transport system.

A transport carriage according to a preferred embodiment of the present invention will be described below with reference to the accompanying drawings. First, a transport system incorporating the transport carriage according to the embodiment will be described below. FIG. 1 illustrates, in plan, the transport system, denoted by 2.

As illustrated in FIG. 1, the transport system 2 is a system for transporting a workpiece 11 over a plurality of processing apparatuses 4 that process the workpiece 11. Though only one processing apparatus 4 is illustrated in FIG. 1, the number of processing apparatuses 4 that can be included in the transport system 2 is not limited but freely selectable.

The processing apparatus 4 may be any type of processing apparatus. For example, the processing apparatus 4 may be a cutting apparatus for cutting the workpiece 11, a grinding apparatus for grinding the workpiece 11, a polishing apparatus for polishing the workpiece 11, or a laser processing apparatus for processing the workpiece 11 with a laser beam.

The cutting apparatus includes a processing unit, i.e., a cutting unit, for cutting the workpiece 11. The cutting unit includes a spindle with an annular cutting blade mounted on a distal end of the spindle. The cutting unit cuts the workpiece 11 by rotating the cutting blade while causing the cutting blade to cut into the workpiece 11.

The grinding apparatus includes a processing unit, i.e., a grinding unit, for grinding the workpiece 11. The grinding unit includes a spindle with an annular grinding wheel mounted on a distal end of the spindle, the grinding wheel including a plurality of grindstones. The grinding unit grinds the workpiece 11 by rotating the grinding wheel while causing the grindstones to abrasively contact the workpiece 11.

The polishing apparatus includes a processing unit, i.e., a polishing unit, for polishing the workpiece 11. The polishing unit includes a spindle with a disk-shaped polishing pad mounted on a distal end of the spindle. The polishing unit polishes the workpiece 11 by rotating the polishing pad while causing the polishing pad to contact the workpiece 11.

The laser processing apparatus includes a processing unit, i.e., a laser beam applying unit, for processing the workpiece 11 with a laser beam. The laser processing unit includes, for example, a laser oscillator for emitting a laser beam having a predetermined wavelength by way of pulsed oscillation, and a beam condenser for converging the laser beam emitted from the laser oscillator. The laser beam applying unit processes the workpiece 11 with the laser beam by focusing the laser beam emitted from the laser oscillator onto a face side or a reverse side of the workpiece 11 or within the workpiece 11.

For example, the workpiece 11 includes a disk-shaped wafer made of a semiconductor material such as monocrystalline silicon. The workpiece 11 has a face side, i.e., a first surface, and a reverse side, i.e., a second surface, which lie generally parallel to each other. The workpiece 11 has a plurality of rectangular areas demarcated on the face side by a grid of streets or projected dicing lines that extend across each other. Devices such as integrated circuits (ICs), large-scale-integration (LSI) circuits, light-emitting diodes (LEDs), or microelectromechanical systems (MEMS) devices are constructed respectively in the demarcated areas. When processed by the cutting apparatus or the laser processing apparatus, the workpiece 11 is divided along the streets into a plurality of device chips that include the respective devices. The grinding apparatus and/or the polishing apparatus may grind and/or polish the workpiece 11 before the workpiece 11 is divided, so that thinned device chips can be fabricated from the workpiece 11 when the workpiece 11 is divided.

The workpiece 11 is not limited to any kinds, materials, sizes, shapes, and structures, for example. For example, the workpiece 11 may include a wafer or substrate made of a semiconductor such as GaAs, InP, GaN, or SiC other than silicon, sapphire, glass, ceramic, resin, or metal. The devices are not limited to any kinds, numbers, shapes, structures, sizes, and layouts, for example. The workpiece 11 may even be free of any devices. The workpiece 11 may include a packaged substrate such as a chip-size-package (CSP) substrate or a quad-flat-non-leaded-package (QFN) substrate. For example, the packaged substrate is fabricated by mounting a plurality of device chips on a given substrate and covering or encapsulating the mounted device chips with a resin layer, i.e., a layer of molded resin. The packaged substrate is then divided or segmented into packaged devices that include packaged device chips, respectively.

For processing the workpiece 11 on the processing apparatus 4, the workpiece 11 is supported on an annular frame 13 for easy handling, e.g., transportation or holding. The frame 13 includes an annular member made of a metal material such as stainless steel (SUS), and has a circular opening defined centrally therein and extending all the way thicknesswise through the frame 13. The opening in the frame 13 is larger than the workpiece 11 in diameter.

The workpiece 11 is supported by a sheet 15 fixed to the workpiece 11 and the frame 13. For example, the sheet 15 includes a circular tape larger in diameter than the opening in the frame 13, and has a film-shaped base and an adhesive layer, i.e., a glue layer, disposed on the base. The sheet 15 may alternatively include a thermocompression bonding sheet free of an adhesive layer, i.e., a glue layer, which can be thermocompression-bonded to the workpiece 11 and the frame 13. The workpiece 11, the frame 13, and the sheet 15 are put together as follows While the workpiece 11 is being disposed in the opening in the frame 13, the sheet 15 has a central portion affixed to the reverse side of the workpiece 11 and an outer circumferential portion affixed to the frame 13. In this manner, the workpiece 11 is supported on the frame 13 by the sheet 15, making up a workpiece unit, i.e., a frame unit, 17 that includes the workpiece 11, the frame 13, and the sheet 15.

A plurality of pipes 6 are connected to a side surface of the processing apparatus 4. The pipes 6 include supply ducts for supplying liquid and gas to the processing apparatus 4 and drain ducts for draining liquid and gas from the processing apparatus 4, for example.

In a position adjacent to the processing apparatus 4, installed is the transport system 2 including an accommodating apparatus, i.e., a loader/unloader, 8 for accommodating a plurality of workpieces 11 therein. The transport system 2 accommodates workpieces 11 to be processed by the processing apparatus 4 and workpieces 11 processed by the processing apparatus 4.

The transport system 2 also includes a transport passageway 10 installed over the processing apparatuses 4 and the accommodating apparatus 8. The transport passageway 10 extends across spaces between the processing apparatuses 4 and across a space between the illustrated processing apparatus 4 and the accommodating apparatus 8. That is, the processing apparatuses 4 and the accommodating apparatus 8 are connected via the transport passageway 10. An unmanned transport carriage or transport apparatus 12 for transporting workpieces 11 is movably disposed on the transport passageway 10. In FIG. 1, two transport carriages 12 are illustrated as included in the transport system 2. However, the number of transport carriages 12 that can be movably disposed on the transport passageway 10 is not limited but freely selectable.

Each of the transport carriages 12 transports workpieces 11 between the processing apparatuses 4 and also between the illustrated processing apparatus 4 and the accommodating apparatus 8. For example, the transport carriage 12 houses therein workpieces 11 to be processed that have been received from the accommodating apparatus 8, travels on the transport passageway 10 while holding the workpieces 11 housed therein, and transports the workpieces 11 to one of the processing apparatuses 4 that is to process the workpieces 11. The transport carriage 12 houses workpieces 11 received from the processing apparatus 4 that has processed the workpieces 11, travels on the transport passageway 10 while holding the processed workpieces 11 housed therein, and transports the workpieces 11 to another one of the processing apparatuses 4 or the accommodating apparatus 8. The transport passageway 10 includes openings 10a defined in respective regions thereof positioned immediately above the processing apparatuses 4 and the accommodating apparatus 8. The openings 10a extend vertically through the transport passageway 10. The workpieces 11 are transferred through one of the openings 10a between the illustrated processing apparatus 4 and one of the transport carriages 12 that is positioned over the transport passageway 10 next to the illustrated processing apparatus 4 and also through another one of the openings 10a between the accommodating apparatus 8 and the other transport carriage 12 that is positioned over the accommodating apparatus 8.

The transport system 2 transports the workpieces 11 with the transport carriages 12 that travel on the transport passageway 10 disposed above the processing apparatuses 4 and the accommodating apparatus 8. The transport system 2 with the transport carriages 12 can automatically transport the workpieces 11 with increased efficiency. As the pipes 6 are connected to the side surface of the processing apparatus 4, the pipes 6 are prevented from obstructing the workpieces 11 transported on and along the transport passageway 10, so that the workpieces 11 can be smoothly transported along the transport passageway 10.

Figure 2:
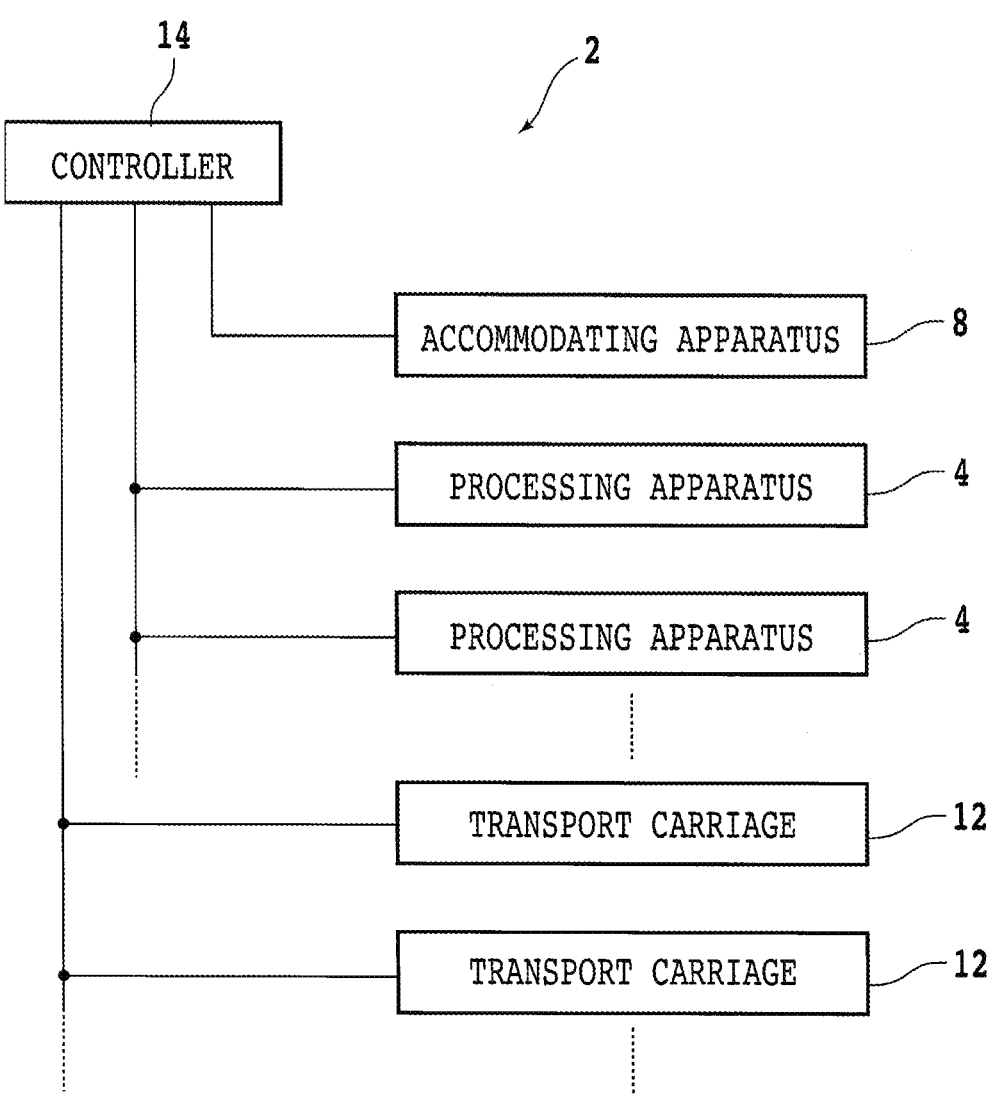
FIG. 2 is a block diagram of the transport system.

FIG. 2 illustrates the transport system 2 in block form. As illustrated in FIG. 2, the transport system 2 includes a controller, i.e., a control unit, a controlling section, or a control apparatus, 14 for supervising and controlling the transport system 2. The controller 14 is electrically connected by a wired or wireless link to the components, i.e., the processing apparatuses 4, the accommodating apparatus 8, and the transport carriages 12, of the transport system 2, and controls operation of the components by outputting control signals or commands to the components, thereby controlling the travel of the transport carriages 12, the transfer of workpieces 11 between the processing apparatuses 4 and the transport carriages 12, and the transfer of workpieces 11 between the accommodating apparatus 8 and the transport carriages 12. Various pieces of information, e.g., signals and data, transmitted from the components of the transport system 2 are input to the controller 14. For example, the controller 14 is configured by a computer and includes a processing device for performing processes such as arithmetic operations required to operate the transport system 2 and a storage device for storing various pieces of information, e.g., data and programs, used to operate the transport system 2. The processing device includes a processor such as a central processing unit (CPU), whereas the storage device includes a memory such as a read only memory (ROM) and a random access memory (RAM).

Figure 3A:
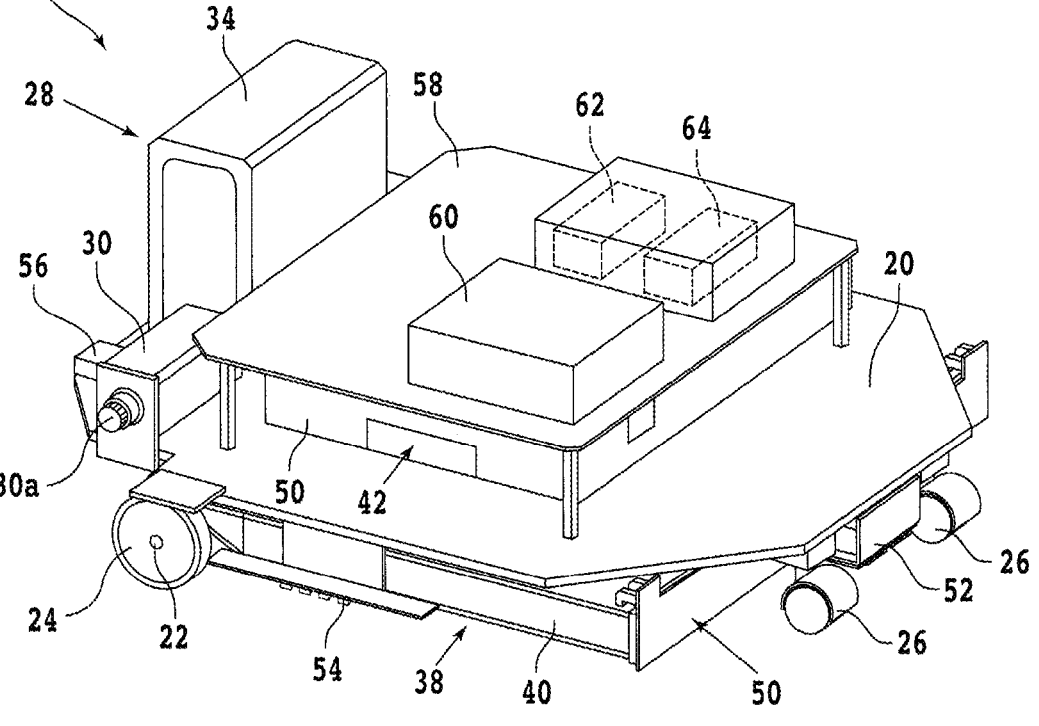
FIG. 3A is a perspective view depicting an upper side of a transport carriage.

Details of the transport carriages 12 for carrying workpieces 11 by traveling on the transport passageway 10 will be described below. The transport carriages 12 are identical in structure to each other, so that one of them will be described as a representative example below. FIG. 3A illustrates, in perspective, an upper side of the transport carriage 12, and FIG. 3B illustrates, in perspective, a lower side of the transport carriage 12.

Figure 3B:
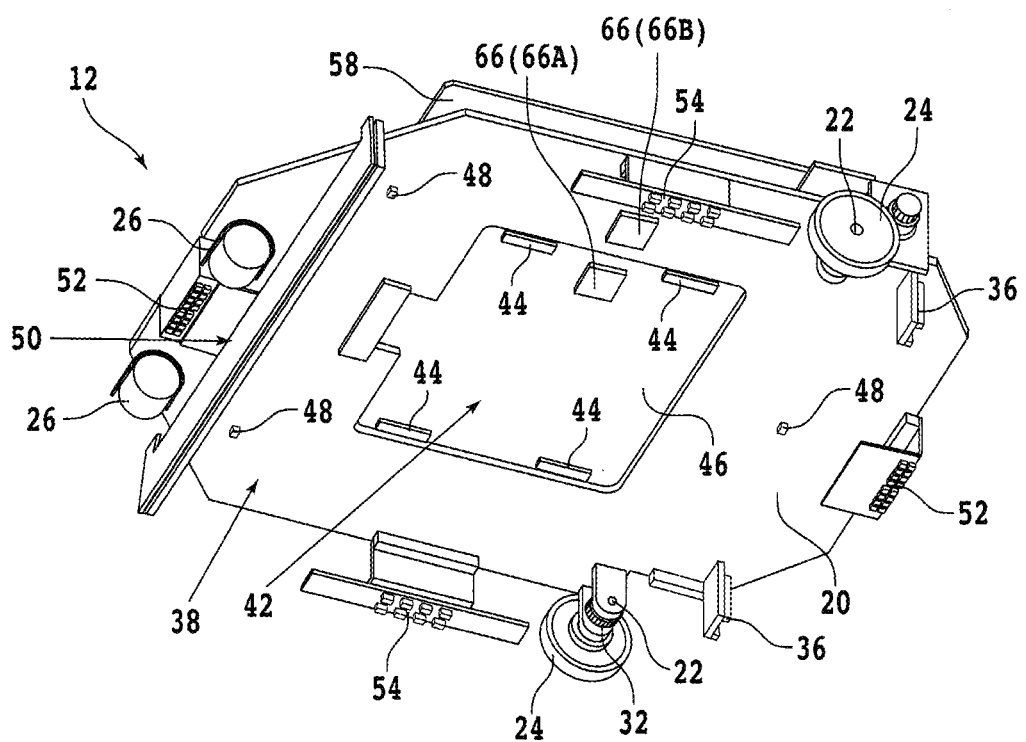
FIG. 3B is a perspective view depicting a lower side of the transport carriage.

As illustrated in FIGS. 3A and 3B, the transport carriage 12 includes a plate-shaped main body frame 20 supporting thereon the components of the transport carriage 12. A pair of axles 22 are rotatably mounted on respective opposite side ends of a front portion of the main body frame 20 and spaced apart from each other widthwise or transversely across the main body frame 20. The axles 22 are disposed on a lower surface of the main body frame 20 such that outer ends of the axles 22 protrude laterally outwardly from respective side surfaces of the main body frame 20. A pair of front wheels 24 are mounted respectively on the respective outer ends of the axles 22. A pair of rear wheels 26 are rotatably mounted on a rear end of the main body frame 20 and spaced apart from each other widthwise or transversely across the main body frame 20. The rear wheels 26 are in the form of casters, for example, rotatable 360° about respective rotational axes generally parallel to the transverse directions of the transport carriage 12. The rear wheels 26 are disposed on the lower surface of the main body frame 20. The front and rear wheels 24 and 26 are drive and driven wheels that are held in rolling contact with the transport passageway 10 (see FIG. 1) for enabling the transport carriage 12 to travel on the transport passageway 10.

As illustrated in FIG. 3A, a drive unit 28 for driving the front wheels 24 is mounted on a front end portion of the main body frame 20. The drive unit 28 includes a pair of electric motors 30, one depicted in FIG. 3A, coupled to the respective front wheels 24 through the axles 22. The electric motors 30 have rotational shafts, i.e., output shafts, 30a and generates rotary power for rotating the front wheels 24 through the axles 22.

As illustrated in FIG. 3B, pulleys 32 are fixed to the other inner ends of the axles 22. Endless members, not depicted, such as belts or chains are trained around the rotational shafts 30a and the pulleys 32. The endless members, the rotational shafts 30a, and the pulleys 32 jointly make up respective power transmitting mechanisms operatively coupling the axles 22 and the electric motors 30 to each other. The power transmitting mechanisms transmit rotary power generated by the electric motors 30 to the front wheels 24, thereby rotating the front wheels 24.

The drive unit 28 controls the directions in which to rotate the front wheels 24 independently with the respective electric motors 30. When the drive unit 28 controls the front wheels 24 to rotate in the same direction, the transport carriage 12 moves forward or backward. Conversely, when the drive unit 28 controls the front wheels 24 to rotate in respective opposite directions, the transport carriage 12 turns about a vertical axis generally parallel to the heightwise direction thereof, thereby controlling the direction in which the transport carriage 12 travels.

The drive unit 28 is electrically connected to a battery, i.e., a secondary battery, 34 that supplies electric power to the electric motors 30 through feeder wires, not depicted. The battery 34 is mounted on the front end portion of the main body frame 20, for example, and supplies electric power to the electric motors 30 to rotate the front wheels 24. The battery 34 may include a lithium ion battery, for example.

As illustrated in FIG. 3B, a pair of power receiving terminals 36 that are electrically connected to the battery 34 via wires are mounted on the lower surface of the front end portion of the main body frame 20. The power receiving terminals 36 can be electrically connected to feeder terminals installed outside of the transport carriage 12, for example. When the power receiving terminals 36 are electrically connected to the feeder terminals, the feeder terminals supply electric power to the power receiving terminals 36 to charge the battery 34.

The transport carriage 12 has a storage area 38 disposed beneath the main body frame 20. The storage area 38 represents a space surrounded by the front wheels 24 and the rear wheels 26 and positioned above respective lower ends of the front wheels 24 and the rear wheels 26. As illustrated in FIG. 3A, a receptacle, i.e., a cassette, 40 capable of housing one or more workpieces 11 therein can be stored in the storage area 38. Structural details of the receptacle 40 will be described later with reference to FIGS. 5A and 5B.

For transporting workpieces 11 with the transport carriage 12, the receptacle 40 that is housing the workpieces 11 therein is placed in the storage area 38. At this time, the receptacle 40 has a lower surface positioned above the lower ends of the front wheels 24 and the rear wheels 26. Therefore, when the transport carriage 12 travels on the transport passageway 10 (see FIG. 1), the receptacle 40 is kept out of contact with the transport passageway 10.

The transport carriage 12 further includes a lifting and lowering unit, i.e., a lifting and lowering mechanism, 42 disposed on an upper surface of the main body frame 20 in overlying relation to the storage area beneath the main body frame 20 for selectively lifting and lowering the receptacle 40 between the storage area 38 and one of the processing apparatuses 4 or the accommodating apparatus 8 (see FIG. 1). The lifting and lowering unit 42 selectively lowers the receptacle 40 stored in the storage area 38 onto a given rest area, to be described below, and lifts the receptacle 40 placed on the rest area into the storage area 38.

Figure 4:
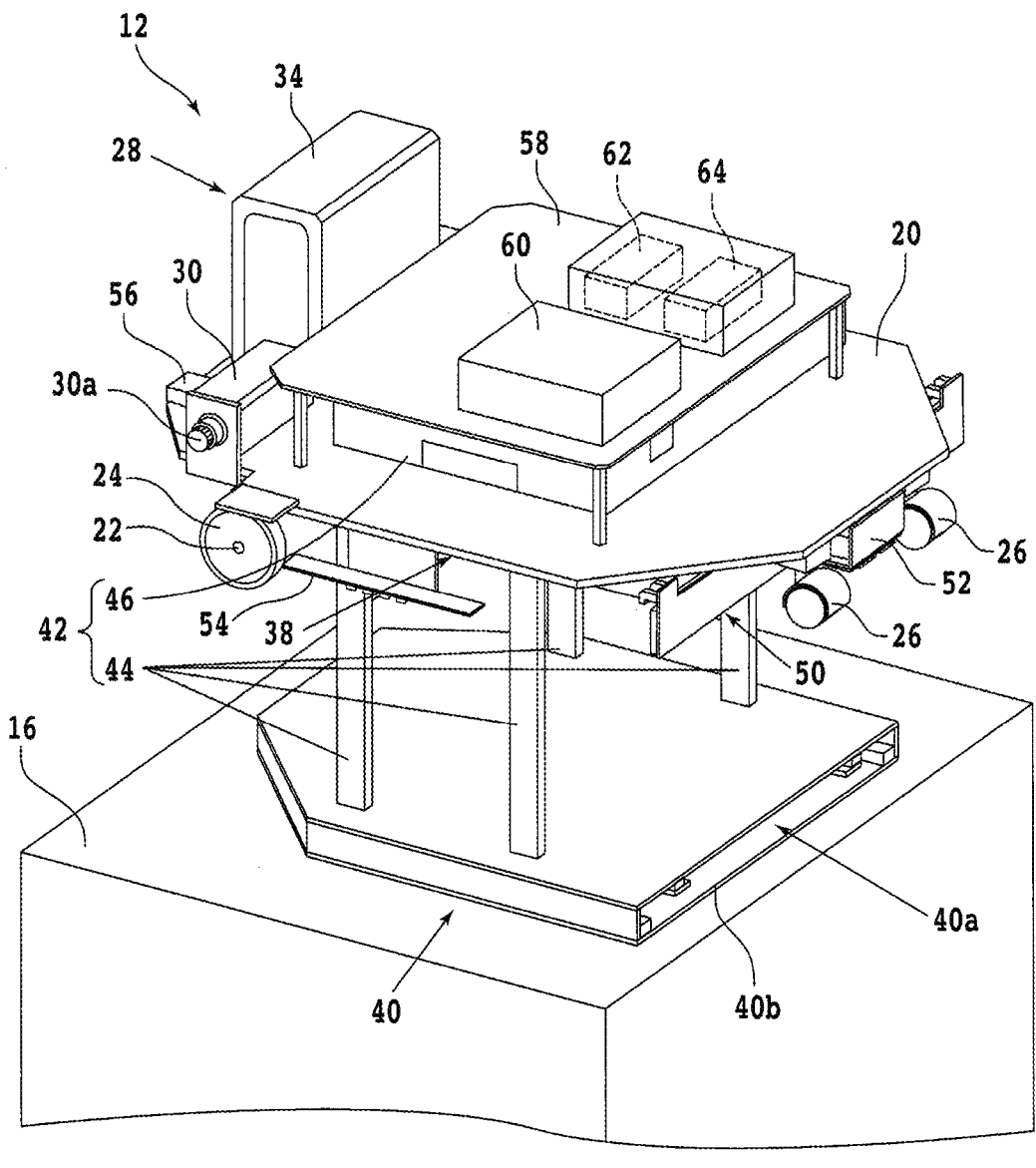
FIG. 4 is a perspective view of the transport carriage as it places a receptacle onto a rest area.

FIG. 4 illustrates, in perspective, the transport carriage 12 as it places the receptacle 40 onto the rest area, i.e., a transport destination, denoted by 16. The lifting and lowering unit 42 includes a plurality of suspending members 44 for suspending the receptacle 40 and a drive mechanism 46 for paying out and reeling in the suspending members 44. The suspending members 44 have respective upper ends connected to the drive mechanism 46 and respective lower ends coupled to the receptacle 40. The rest area 16 is represented by an upper surface of a rest base on which workpieces 11 are temporarily placed in one of the processing apparatuses 4 or the accommodating apparatus 8, for example. The suspending members 44 include belts having a predetermined width or wire ropes that can be paid out and reeled in. FIG. 4 illustrates four belts as the suspending members 44 that have respective lower ends fixed to an upper surface of the receptacle 40 at spaced positions thereon. The number of suspending members 44 that are included in the lifting and lowering unit 42 is not limited but freely selectable.

When the suspending members 44 connected to the receptacle 40 stored in the storage area 38 are paid out by the drive mechanism 46, the receptacle 40 is lowered from the storage area 38 onto the rest area 16. When the suspending members 44 connected to the receptacle 40 placed on the rest area 16 are reeled in by the drive mechanism 46, the receptacle 40 is lifted from the rest area 16 into the storage area 38.

As illustrated in FIG. 3B, a plurality of contact members, i.e., contact pins, 48 are mounted on the lower surface of the main body frame 20 for contacting the upper surface of the receptacle 40. The contact members 48, which are columnar in shape and of essentially the same height, are fixed to the main body frame 20 and protrude downwardly form the lower surface of the main body frame 20. When the receptacle 40 is stored in the storage area 38, the upper surface of the receptacle 40 is contacted by the lower ends of the contact members 48 and supported thereon. For example, the contact members 48 are made of an elastic material so that they are elastically deformed when the receptacle 40 is pressed against the contact members 48. Since the contact members 48 are elastic, they dampen shocks caused when the receptacle 40 contacts the contact members 48, making the receptacle 40 and one or more workpiece units 17 housed therein less liable to be damaged. Moreover, when the transport carriage 12 travels on the transport passageway 10 (see FIG. 1), the contact members 48 function as dampers that reduce vibrations of the main body frame 20 transmitted to the receptacle 40 and one or more workpiece units 17 housed therein.

Specifically, the contact members 48 may be made of rubber, e.g., urethane rubber or silicone rubber, or sponge, for example. Particularly, if the contact members 48 are made of rubber that tends to pose large frictional forces acting between themselves and the receptacle 40, they are effective to prevent the receptacle 40 from being positionally shifted. The contact members 48 may not necessarily be made of an elastic material in their entirety. Rather, at least parts, e.g., lower end portions, of the contact members 48 that contact the receptacle 40 may be made of an elastic material. The contact members 48 should preferably be held in contact with the upper surface of the receptacle 40 at three or more positions. According to the present embodiment, three columnar contact members 48, for example, are mounted on the main body frame 20, as illustrated in FIG. 3B. The three columnar contact members 48 are effective to prevent the receptacle 40 from being tilted with respect to the main body frame 20 because the upper surface of the receptacle 40 is supported along a plane including the lower ends of the three contact members 48. The shape, number, and layout of the contact members 48 can be modified as desired. For example, a pair of linear or strip-shaped contact members 48 that extend generally parallel to each other may be mounted on the lower surface of the main body frame 20. Alternatively, a plate-shaped contact member 48 made of sponge, for example, may be fixed to the entire lower surface of the main body frame 20.

A cover 50 is mounted on the lower surface of a rear end portion of the main body frame 20. The cover 50 covers an opening 40b (see FIG. 4) defined as a workpiece loading/unloading port in the receptacle 40 at the time when the receptacle 40 is stored in the storage area 38. The cover 50 thus covering the opening 40b prevents foreign matter from finding its way into the receptacle 40 and hence from being attached to the workpiece or workpieces 11 in the receptacle 40 while the transport carriage 12 is traveling on the transport passageway 10 (see FIG. 1). Even when the receptacle 40 is tilted or vibrated while the transport carriage 12 is traveling on the transport passageway 10, the cover 50 prevents the workpiece or workpieces 11 from being ejected out of the receptacle 40.

A pair of first sensors 52 are mounted respectively on the front and rear ends of the main body frame 20. A pair of second sensors 54 are mounted respectively on left and right sides of the main body frame 20. The first sensors 52 and the second sensors 54 are positioned in facing relation to the transport passageway 10 on which the transport carriage 12 travels, and detect marks on the transport passageway 10. Operation, i.e., traveling, turning, and stopping, of the transport carriage 12 is controlled on the basis of the marks as detected by the first sensors 52 and the second sensors 54. As illustrated in FIG. 3A, a pair of third sensors 56, one depicted in FIG. 3A, are mounted on a front end of the main body frame 20 for detecting when the transport carriage 12 collides with an obstacle. When the transport carriage 12 collides with an obstacle, the third sensors 56 detect the collision, bringing the transport carriage 12 to an emergency stop. Each of the third sensors 56 may include a pushbutton switch, for example, though it is not limited to any particular type of sensor as long as it can detect a collision of the transport carriage 12 with an obstacle.

The transport carriage 12 further includes a plate-shaped support base 58 fixedly mounted on the main body frame 20 over the lifting and lowering unit 42. The support base 58 supports thereon a controller, i.e., a control unit, a controlling section, or a control apparatus, 60 for controlling the transport carriage 12 and a receiver 62 and a transmitter 64 that are electrically connected to the controller 60.

The controller 60 is electrically connected to the components of the transport carriage 12 that include the drive unit 28, the battery 34, the lifting and lowering unit 42, the first sensors 52, the second sensors 54, the third sensors 56, the receiver 62, and the transmitter 64, and controls operation of these components. For example, the controller 60 is configured by a computer and includes a processing device for performing processes such as arithmetic operations required to operate the transport carriage 12 and a storage device for storing various pieces of information, e.g., data and programs, used to operate the transport carriage 12. The processing device includes a processor such as a CPU, whereas the storage device includes a memory such as a ROM and a RAM.

The receiver 62 receives signals, i.e., information, from an external circuit and inputs the received signals to the controller 60. For example, the receiver 62 receives information, i.e., signals and data, transmitted from the controller 14 (see FIG. 2) of the transport system 2 and inputs the received information to the controller 60. The controller 60 controls operation of the transport carriage 12 on the basis of the information received from the receiver 62. The transmitter 64 receives signals, i.e., information, from the controller 60 and transmits the received signals to an external circuit. For example, the controller 60 outputs information, i.e., signals and data, about the transport carriage 12 to the transmitter 64. The transmitter 64 transmits the information received from the controller 60 to the controller 14 of the transport system 2.

As illustrated in FIG. 3B, the transport carriage 12 according to the present embodiment has one or more sensors or detectors 66 (two sensors 66 in the present embodiment) disposed on the lower surface of the main body frame 20 for detecting workpieces 11 housed in the receptacle 40. The sensors 66 include detectors for detecting workpieces 11 through the receptacle 40 and are electrically connected to the controller 60. The controller 60 controls the sensors 66 to detect workpieces 11 housed in the receptacle 40. Functional details of the sensors 66 will be described later with reference to FIG. 5B.

The lifting and lowering unit 42, the first sensors 52, the second sensors 54, the third sensors 56, the controller 60, the receiver 62, the transmitter 64, and the sensors 66 may be electrically connected to the battery 34 through feeder wires, not depicted. The lifting and lowering unit 42, the first sensors 52, the second sensors 54, the third sensors 56, the controller 60, the receiver 62, the transmitter 64, and the sensors 66 can therefore be operated by electric power supplied from the battery 34.

Figure 5A:
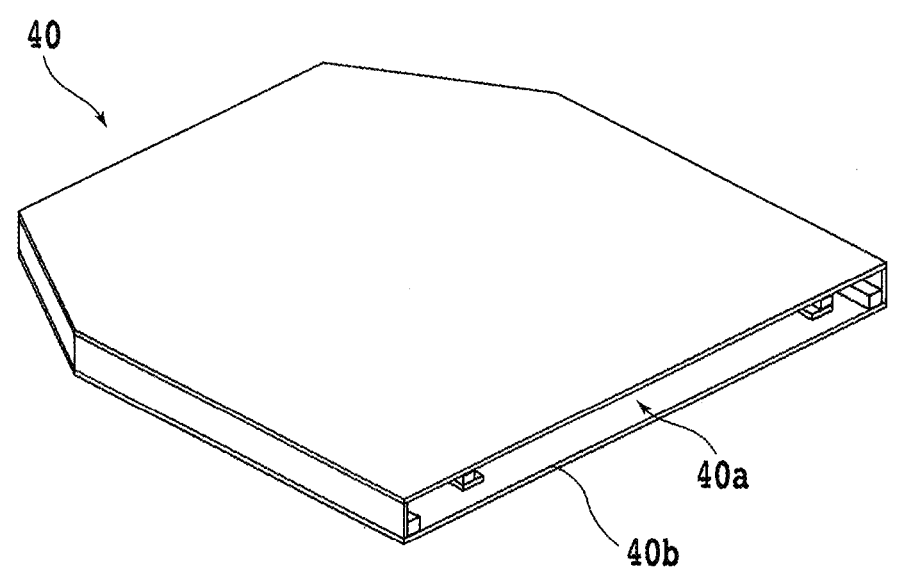
FIG. 5A is a perspective view of the receptacle.
Figure 5B:
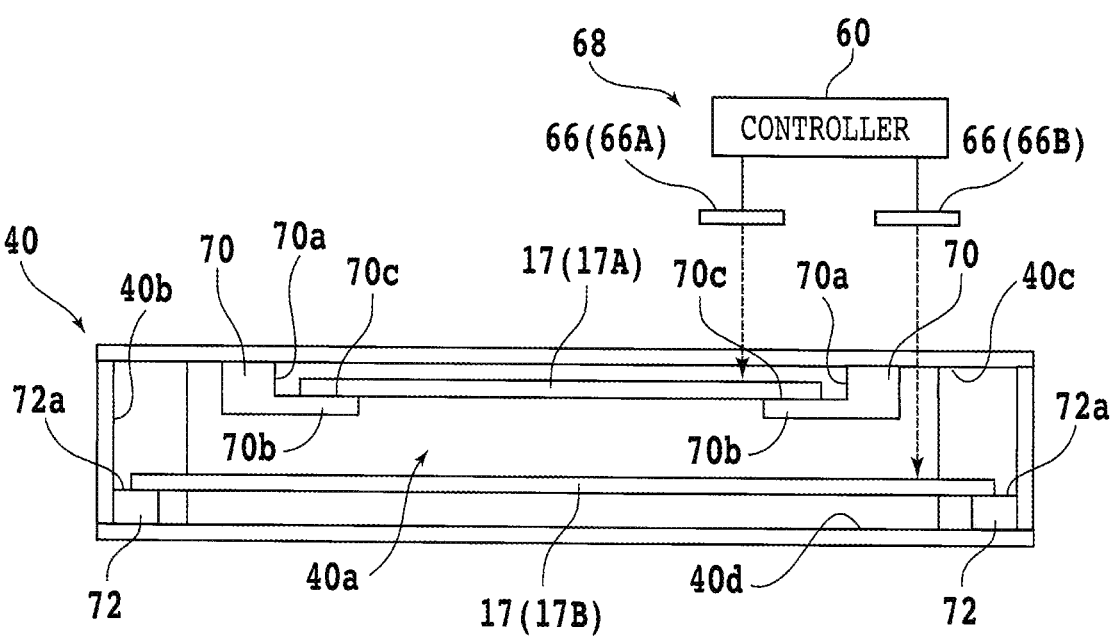
FIG. 5B is a front elevational view of the receptacle.

Structural details of the receptacle 40 that houses workpieces 11 will be described below. FIG. 5A illustrates the receptacle 40 in perspective, and FIG. 5B illustrates the receptacle 40 in front elevation. The receptacle 40 to be described below is capable of housing, for example, two kinds of workpiece units 17, i.e., a workpiece unit 17A and a workpiece unit 17B (see FIG. 5B), which are different in size and weight from each other. The workpiece unit 17A and the workpiece unit 17B have respective workpieces 11, frames 13, and sheets 15 (see FIG. 1).

The receptacle 40 is of a hexagonal shape as viewed in plan, for example, and has a housing area, i.e., a housing space, 40a defined therein for housing the workpiece units 17A and 17B therein. The housing area 40a is open toward the outside of the receptacle 40 via a slit-shaped opening 40b that is defined in a side panel of the receptacle 40. The workpiece units 17 can be loaded into the housing area 40a through the opening 40b and unloaded from the housing area 40a through the opening 40b.

The receptacle 40 is able to house the workpiece units 17A and 17B simultaneously in the housing area 40a.

Specifically, a pair of first guide rails 70 for supporting the workpiece unit 17A and a pair of second guide rails 72 for supporting the workpiece unit 17B are disposed in the housing area 40a in the receptacle 40. Each of the first guide rails 70 that are spaced from each other has a side wall 70a fixed to an upper wall 40c of the housing area 40a, i.e., the receptacle 40 and a ledge 70b protruding laterally from a lower end of the side wall 70a. The ledges 70b of the first guide rails 70 have respective upper surfaces acting as holding surfaces 70c for holding a lower surface of the workpiece unit 17A. The second guide rails 72 are fixed to a bottom wall 40d of the housing area 40a, i.e., the receptacle 40, and are spaced from each other. The second guide rails 72 have respective upper surfaces acting as holding surfaces 72a for holding a lower surface of the workpiece unit 17B.

The distance between the first guide rails 70 is adjusted such that their holding surfaces 70c can support the workpiece unit 17A from below. Similarly, the distance between the second guide rails 72 is adjusted such that their holding surfaces 72a can support the workpiece unit 17B from below. However, the distance between the first guide rails 70 is smaller than the distance between the second guide rails 72. The workpiece unit 17A includes a workpiece 11 having a diameter of 200 mm (8 inches) and a frame 13 that supports the workpiece 11, for example. The workpiece unit 17B includes a workpiece 11 having a diameter of 300 mm (12 inches) and a frame 13 that supports the workpiece 11, for example. The frame 13 of the workpiece unit 17A is smaller in diameter and weight than the frame 13 of the workpiece unit 17B.

When the workpiece units 17A and 17B are introduced into the receptacle 40, the frame 13 of the workpiece unit 17A is supported on the first guide rails 70 and the frame 13 of the workpiece unit 17B is supported on the second guide rails 72. As described above, the receptacle 40 is able to house the two kinds of workpiece units 17A and 17B that are of different sizes.

The receptacle 40 that has housed the workpieces 11 therein is stored in the storage area 38 in the transport carriage 12 (see FIG. 3A). The workpieces 11 housed in the receptacle 40 are then detected by the sensors 66 (see FIG. 3B) mounted on the lower surface of the main body frame 20 of the transport carriage 12. Specifically, in a case where the two kinds of workpiece units 17A and 17B are housed in the receptacle 40, the sensors 66 include a sensor 66A for detecting the workpiece unit 17A and a sensor 66B for detecting the workpiece unit 17B. As illustrated in FIG. 5B, the sensor 66A detects the workpiece unit 17A through the upper wall 40c of the receptacle 40 and the sensor 66B detects the workpiece unit 17B through the upper wall 40c of the receptacle 40. In this manner, it is confirmed whether the workpiece units 17A and 17B are stored in the receptacle 40 or not.

The sensor 66A includes a detector capable of detecting at least one of the workpiece 11, the frame 13, or the sheet 15 (see FIG. 1) of the workpiece unit 17A housed in the receptacle 40. The sensor 66A is installed in a position where it can detect the workpiece unit 17A housed in the receptacle 40. For example, the sensor 66A is installed in vertically (along the height of the transport carriage 12) overlapping the workpiece 11, the frame 13, or the sheet 15 of the workpiece unit 17A housed in the receptacle 40.

The sensor 66B includes a detector capable of detecting at least one of the workpiece 11, the frame 13, or the sheet 15 (see FIG. 1) of the workpiece unit 17B housed in the receptacle 40. The sensor 66B is installed in a position where it can detect the workpiece unit 17B housed in the receptacle 40. For example, the sensor 66B is installed out of vertically overlapping relation to the workpiece unit 17A housed in the receptacle 40 and the first guide rails 70, but is installed in vertically overlapping the workpiece 11, the frame 13, or the sheet 15 of the workpiece unit 17B housed in the receptacle 40.

In a case where the workpiece units 17A and 17B are housed in the receptacle 40, the workpiece 17A is detected by the sensor 66A, and the workpiece 17B is detected by the sensor 66B. The sensors 66A and 66B may detect the workpieces 11 directly or may detect the workpieces 11 indirectly by detecting the frames 13 or the sheets 15.

Each of the sensors 66A and 66B includes a non-contact-type sensor capable of detecting a target out of contact therewith. For example, each of the sensors 66A and 66B includes a photoelectric sensor including a light emitter for emitting light and a light detector for detecting light emitted from the light emitter. Each of the sensors 66A and 66B may be any of various types of photoelectric sensors including a transmissive photoelectric sensor and a reflective photoelectric sensor. Alternatively, each of the sensors 66A and 66B may include an image capturing unit or camera including an image sensor such as a charge-coupled-device (CCD) sensor or a complementary-metal-oxide-semiconductor (CMOS) sensor, for example.

The receptacle 40 is constructed such that the sensors 66A and 66B can detect the workpiece units 17A and 17B through the receptacle 40. Specifically, if the sensors 66A and 66B are optical sensors such as photoelectric sensors or image capturing units, then the receptacle 40 is made of such a material that light, i.e., detectable light, to be detected by the sensors 66A and 66B can pass through the receptacle 40. For example, if the sensors 66A and 66B are visible light sensors for detecting visible light, then the receptacle 40 is made of a transparent material such as plastic or glass, for example, through which visible light passes. However, the receptacle 40 is not limited to any structural details as long as the sensors 66A and 66B can detect the workpiece units 17A and 17B through the receptacle 40. For example, only the region of the receptacle 40 through which detectable light passes may be made of a transparent material that allows detectable light to pass therethrough. Alternatively, an opening, i.e., a through opening, may be defined in the region of the receptacle 40 to be irradiated with detectable light. Since detectable light passes through the through opening, the other region of the receptacle 40 may be made of a material that is freely selected.

The sensors 66A and 66B generate signals, i.e., detected signals, representing the results of detection of the workpiece units 17A and 17B and output the detected signals to the controller 60. The controller 60 then determine whether the workpiece units 17A and 17B are housed in the receptacle 40 or not on the basis of the detected signals. For example, the controller 60 compares intensities $I_A$ and $I_B$ of the detected signals input from the sensors 66A and 66B with a reference value, i.e., a threshold value, $I_{ref}$ preset for the intensities of detected signals. If the intensity $I_A$ is higher than the reference value $I_{ref}$, then the controller 60 determines that the workpiece 11 of the workpiece unit 17A is housed in the receptacle 40. If the intensity $I_A$ is lower than the reference value $I_{ref}$, then the controller 60 determines that the workpiece 11 of the workpiece unit 17A is not housed in the receptacle 40. Similarly, if the intensity $I_B$ is higher than the reference value $I_{ref}$, then the controller 60 determines that the workpiece 11 of the workpiece unit 17B is housed in the receptacle 40. If the intensity $I_B$ is lower than the reference value $I_{ref}$, then the controller 60 determines that the workpiece 11 of the workpiece unit 17B is not housed in the receptacle 40.

As described above, the controller 60 and the sensors 66A and 66B automatically determine whether the workpieces 11 are housed in the receptacle 40 or not and also the kinds of the workpieces 11 housed in the receptacle 40. The controller 60 and the sensors 66A and 66B jointly make up a determining unit 68 for determining a workpiece housing state of the receptacle 40. The sensors 66 may detect a plurality of kinds of workpiece units 17. For example, the transport carriage 12 may include a single sensor 66 capable of detecting both the workpiece units 17A and 17B. The receptacle 40 may be capable of housing one kind of workpiece unit 17 or three or more kinds of workpiece units 17.

The workpiece housing state of the receptacle 40 may be determined by other processes than the detection of the workpieces 11 by the sensors 66. For example, it may be determined whether the workpieces 11 are housed in the receptacle 40 or not on the basis of a load that is imposed on the lifting and lowering unit 42 at the time it lifts and lowers the receptacle 40 (see FIG. 4). A process of determining the workpiece housing state of the receptacle 40 using the lifting and lowering unit 42 will be described below.

Figure 6:
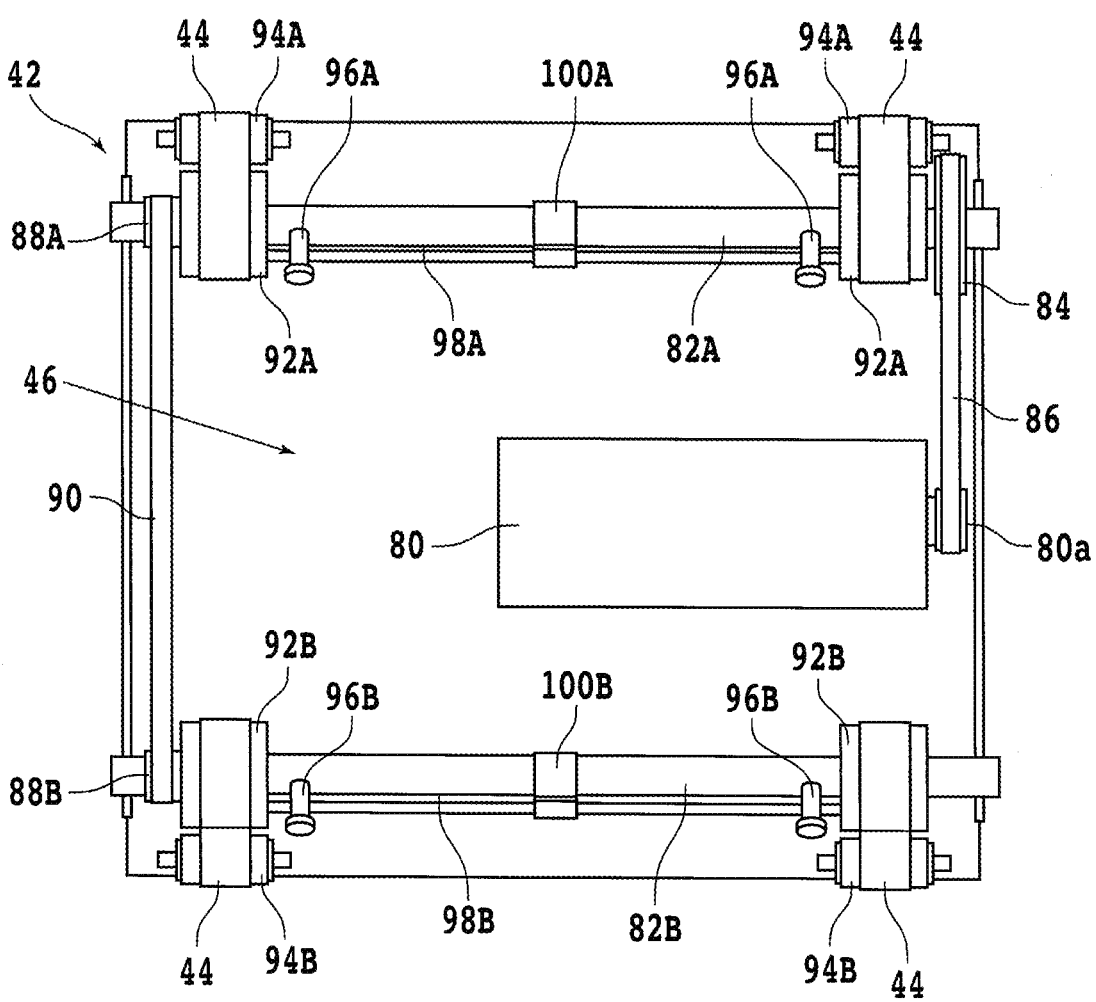
FIG. 6 is a plan view of a lifting and lowering unit of the transport carriage.

FIG. 6 illustrates the lifting and lowering unit 42 in plan. As described above, the lifting and lowering unit 42 includes a plurality of the suspending members 44 for suspending the receptacle 40 and the drive mechanism 46 for paying out and reeling in the suspending members 44.

The drive mechanism 46 includes an electric motor 80 having a rotational shaft, i.e., an output shaft, 80a. The electric motor 80 includes a stepping motor or a servomotor, for example, and rotates the rotational shaft 80a to generate rotary power required to pay out and reel in the suspending members 44. The lifting and lowering unit 42 also includes a pair of rods, i.e., rotational shafts, 82A and 82B disposed one on each side of the electric motor 80, i.e., upper and lower sides of the electric motors 80 in FIG. 6. The rods 82A and 82B extend generally parallel to each other on both sides of the electric motor 80 as viewed in plan in FIG. 6.

A pulley 84 is fixed to an end of the rod 82A. An endless joint member 86 such as a belt or chain, for example, is trained around the rotational shaft 80a of the electric motor 80 and the pulley 84. The rotational shaft 80a, the pulley 84, and the endless joint member 86 jointly make up a power transmitting mechanism for transmitting the rotary power of the electric motor 80 to the rod 82A, so that the electric motor 80 and the rod 82A are operatively connected to each other. No pulley is mounted on an end of the rod 82B that is aligned with the end of the rod 82A to which the pulley 84 is fixed.

A pulley 88A is fixed to the other end of the rod 82A, and similarly a pulley 88B that is of the same diameter as the pulley 88A is fixed to the other end of the rod 82B. An endless joint member 90 such as a belt or chain, for example, is trained around the pulleys 88A and 88B. The pulleys 88A and 88B and the endless joint member 90 jointly make up a power transmitting mechanism for transmitting the rotary power of the rod 82A to the rod 82B, so that the rod 82A and the rod 82B are operatively connected to each other.

A pair of rotatable cylindrical reels 92A are mounted on respective opposite end portions of the rod 82A. Two of the suspending members 44 are wound on the respective reels 92A. The reels 92A have respective through holes, not depicted, defined centrally therethrough in their axial directions, and the opposite end portions of the rod 82A are inserted through the through holes in the reels 92A. The reels 92A are not fixed to the rod 82A, but are rotatably mounted on the rod 82A. Therefore, when external forces are applied to rotate the reels 92A, the reels 92A are rotated independently of the rod 82A about a rotational axis generally parallel to the longitudinal axis of the rod 82A.

A pair of cylindrical rollers 94A that support the suspending members 44 are disposed outwardly of the reels 92A remotely from the electric motor 80. The rollers 94A are disposed below the respective reels 92A (see FIG. 7) and rotatable about a rotational axis generally parallel to the longitudinal axis of the rod 82A.

A pair of columnar pressers, i.e., protrusions or convexities, 96A are fixed to the rod 82A and protrude radially outwardly from a side surface, i.e., an outer circumferential surface, of the rod 82A. The pressers 96A are disposed between the reels 92A. The reels 92A are coupled to each other by a bar or shaft 98A extending generally parallel to the rod 82A. The bar 98A has opposite ends fixed to respective surfaces of the reels 92A that face each other. When the reels 92A are rotated, the bar 98A is rotated around the rod 82A in unison with the reel 92A while being kept generally parallel to the rod 82A.

The rod 82A and the bar 98A are coupled to each other by a biasing member 100A. The biasing member 100A includes a spring, e.g., a spiral spring shaped as a spirally coiled metal strip. The spiral spring has a proximal end portion wound around a central portion of the rod 82A and fixed thereto. The spiral spring has an opposite distal end fixed to a center of the bar 98A and hence coupled to the reels 92A through the bar 98A.

A pair of rotatable cylindrical reels 92B are mounted on respective opposite end portions of the rod 82B. The other two suspending members 44 are wound on the respective reels 92B. The reels 92B have respective through holes, not depicted, defined centrally therethrough in their axial directions, and the opposite end portions of the rod 82B are inserted through the through holes in the reels 92B. The reels 92B are not fixed to the rod 82B, but are rotatably mounted on the rod 82B. Therefore, when external forces are applied to rotate the reels 92B, the reels 92B are rotated independently of the rod 82B about a rotational axis generally parallel to the longitudinal axis of the rod 82B.

A pair of cylindrical rollers 94B that support the suspending members 44 are disposed outwardly of the reels 92B remotely from the electric motor 80. The rollers 94B are disposed below the respective reels 92B (see FIG. 7) and rotatable about a rotational axis generally parallel to the longitudinal axis of the rod 82B.

A pair of columnar pressers, i.e., protrusions or convexities, 96B are fixed to the rod 82B and protrude radially outwardly from a side surface, i.e., an outer circumferential surface, of the rod 82B. For example, the pressers 96B are disposed between the reels 92B. The reels 92B are coupled to each other by a bar or shaft 98B extending generally parallel to the rod 82B. The bar 98B has opposite ends fixed to respective surfaces of the reels 92B that face each other. When the reels 92B are rotated, the bar 98B is rotated around the rod 82B in unison with the reel 92B while being kept generally parallel to the rod 82B.

The rod 82B and the bar 98B are coupled to each other by a biasing member 100B. The biasing member 100B includes a spring, e.g., a spiral spring shaped as a spirally coiled metal strip. The spiral spring has an end portion wound around a central portion of the rod 82B and fixed thereto. The spiral spring has an opposite end fixed to a center of the bar 98B and hence coupled to the reels 92B through the bar 98B.

The suspending members 44 are wound respectively around the reels 92A and the reels 92B. The suspending members 44 have ends, i.e., distal ends or lower ends, connected to the receptacle 40 (see FIG. 4) and other ends, i.e., proximal ends or upper ends, connected to the reels 92A and 92B. The suspending members 44 that are connected to the reels 92A are held in contact with outer circumferential surfaces, i.e., side surfaces, of the rollers 94A and hang downwardly. Similarly, the suspending members 44 that are connected to the reels 92B are held in contact with outer circumferential surfaces, i.e., side surfaces, of the rollers 94B and hang downwardly.

Figure 7:
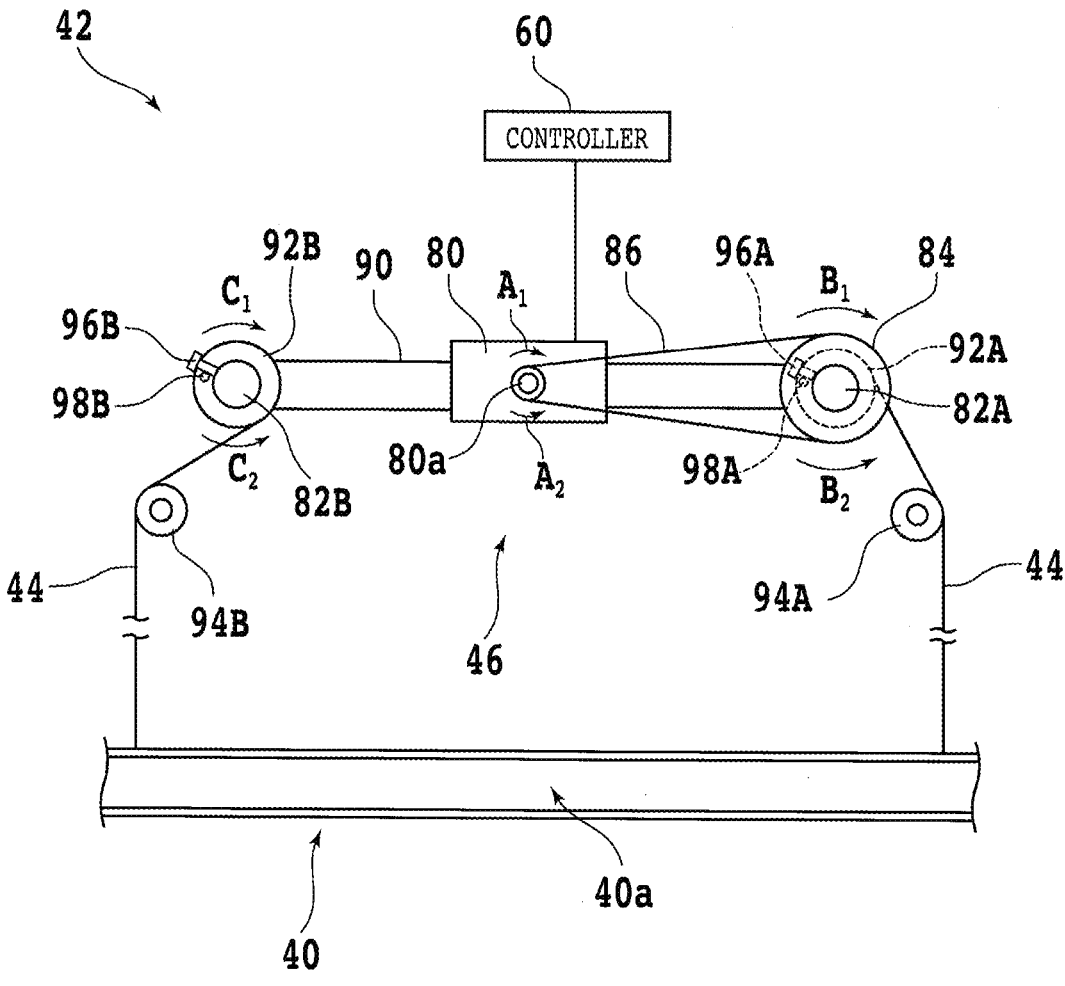
FIG. 7 is a front elevational view of the lifting and lowering unit.

FIG. 7 illustrates the lifting and lowering unit 42 in plan. For illustrative purposes, some of the components of the lifting and lowering unit 42 are omitted from illustration in FIG. 7.

The suspending members 44 wound around the reels 92A are paid out from an upper side of the reels 92A and supported on the rollers 94A. The suspending members 44 wound around the reels 92B are paid out from a lower side of the reels 92B and supported on the rollers 94B. The controller 60 controls the electric motor 80 to control rotation of the reels 92A and 92B, thereby controlling the suspending members 44 as they are paid out and reeled in to lift and lower the receptacle 40, as described later. When the transport carriage 12 travels on the transport passageway 10 (see FIG. 1) until it reaches a position immediately above one of the processing apparatuses 4 or the accommodating apparatus 8 as a transport destination, the lifting and lowering unit 42 pays out the suspending members 44 to lower the receptacle 40. The receptacle 40 descends through the opening 10a (see FIG. 1) in the transport passageway 10 and is placed on a given location, i.e., the rest area 16 (see FIG. 4), in the processing apparatus 4 or the accommodating apparatus 8.

Specific details of operation of the lifting and lowering unit 42 will be described below. The controller 60 controls the torque of the electric motor 80 to allow the rotational shaft 80a to rotate in a rotating direction $A_1$ indicated by the arrow $A_1$. The reels 92A are now rotated in a rotating direction $B_1$ indicated by the arrow $B_1$ to pay out the suspending members 44 under the weight of the receptacle 40, paying out the suspending members 44 wound around the reels 92A. At this time, the bar 98A is rotated in unison with the reels 92A and come into contact with the pressers 96A fixed to the rod 82A. The bar 98A presses the pressers 96A, causing the rod 82A to rotate in the rotating direction $B_1$ in unison with the reels 92A. Similarly, the reels 92B are rotated in a rotating direction $C_1$ indicated by the arrow $C_1$ to pay out the suspending members 44 under the weight of the receptacle 40, paying out the suspending members 44 wound around the reels 92B. The rod 82B is rotated in the rotating direction $C_1$ in unison with the reels 92B.

As the suspending members 44 are paid out respectively from the reels 92A and 92B, the receptacle 40 is lowered. At this time, the controller 60 can control the torque of the electric motor 80 to adjust the speed of descent of the receptacle 40. For example, if the receptacle 40 is heavy, causing the suspending members 44 to pay out too fast under the weight of the receptacle 40, then the controller 60 applies a force to the rotational shaft 80a of the electric motor 80 in a rotating direction $A_2$ indicated by the arrow $A_2$ that is opposite the rotating direction $A_1$.

The power of the rotational shaft 80a is transmitted via the joint member 86 and the pulley 84 to the rod 82A. Now, a force is applied to the rod 82A in a rotating direction $B_2$ indicated by the arrow $B_2$ that is opposite the rotating direction $B_1$. The pressers 96A fixed to the rod 82A then press the bar 98A in the rotating direction $B_2$. As a result, a force in the rotating direction $B_2$ is applied to the reels 92A coupled to the bar 98A, decelerating the rotation of the reels 92A in the rotating direction $B_1$. The power of the rod 82A is transmitted through the pulleys 88A and 88B (see FIG. 6) and the joint member 90 to the rod 82B. A force is applied to the rod 82B in a rotating direction $C_2$ indicated by the arrow $C_2$ that is opposite the rotating direction $C_1$. The pressers 96B fixed to the rod 82B then press the bar 98B in the rotating direction $C_2$. As a result, a force in the rotating direction $C_2$ is applied to the reels 92B coupled to the bar 98B, decelerating the rotation of the reels 92B in the rotating direction $C_1$.

Figures 8A, 8B:
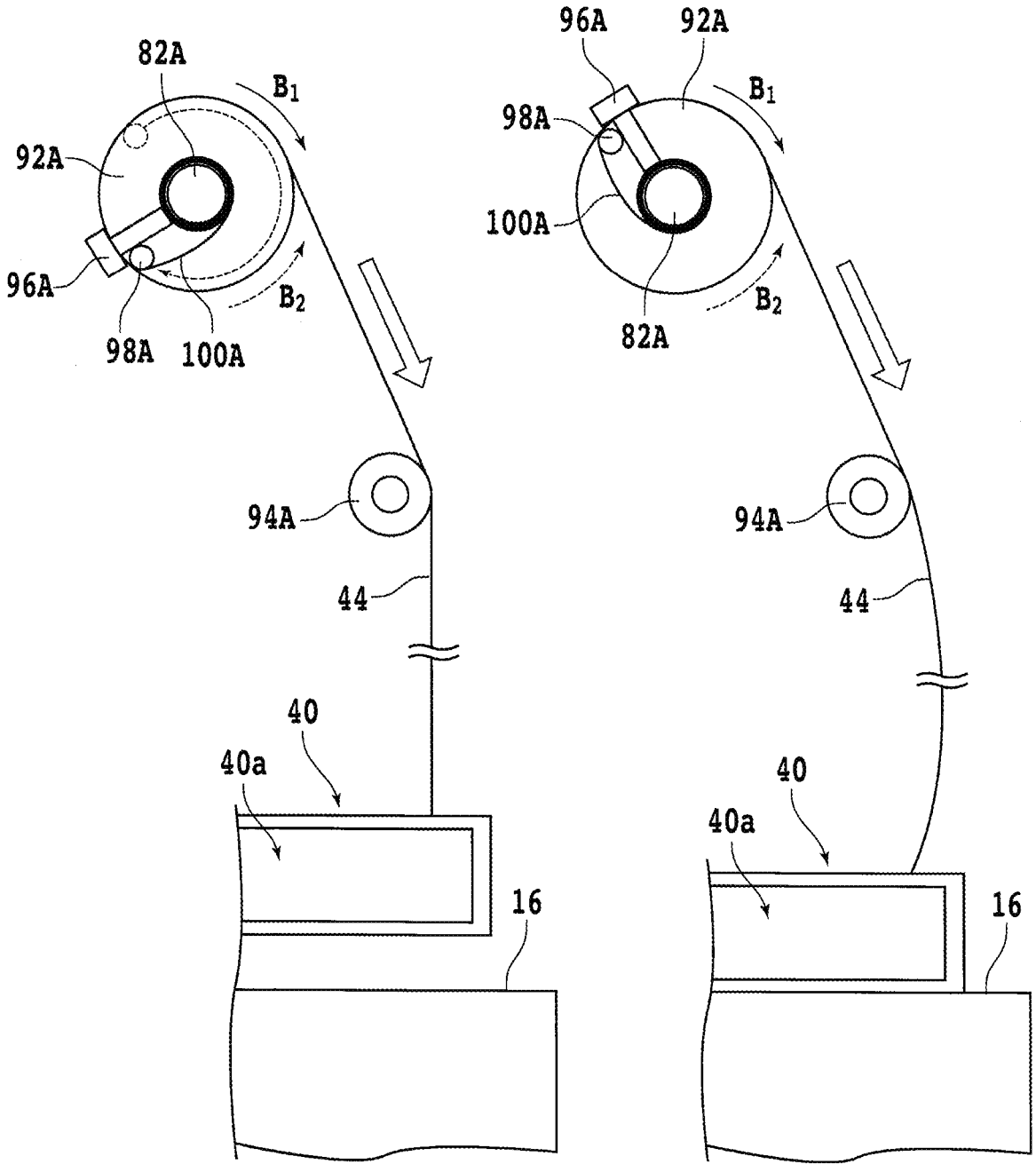
FIG. 8A is a front elevational view of a reel as it rotates to pay out a suspending member.
FIG. 8B is a front elevational view of the reel at the time when the receptacle is placed on the rest area.

FIG. 8A illustrates, in front elevation, the reel 92A as it rotates to pay out the suspending member 44. When the reel 92A rotates in the rotating direction $B_1$ under the weight of the receptacle 40, the bar 98A fixed to the reels 92A rotates in the rotating direction $B_1$ until it contacts the pressers 96A. At this time, the distal end of the biasing member 100A that is fixed to the rod 82A is pulled by the bar 98A, causing the biasing member 100A to be deformed and contracted so as to be wound around the rod 82A. As a result, the restoring force of the biasing member 100A acts on the bar 98A and the reels 92A, biasing the reels 92A in the opposite direction, i.e., the rotating direction $B_2$, to the rotating direction $B_1$. While the receptacle 40 is being lowered, however, since the force with which the receptacle 40 pulls the reels 92A is stronger than the force with which the biasing member 100A biases the reels 92A, the reels 92A rotate in the rotating direction $B_1$, paying out the suspending members 44. Likewise, the biasing member 100B (see FIG. 6) also biases the reels 92B in the rotating direction $C_2$ (see FIG. 7).

When the suspending members 44 have been paid out from the respective reels 92A and 92B by predetermined lengths, the receptacle 40 reaches the rest area 16. FIG. 8B illustrates, in front elevation, the reel 92A at the time when the receptacle 40 is placed on the rest area 16. When the receptacle 40 is placed on the rest area 16, the weight of the receptacle 40 no longer acts on the reels 92A. However, inasmuch as the reels 92A do not stop immediately, the suspending members 44 continue to be slightly paid out from the reels 92A. Consequently, the suspending members 44 that are excessively paid out are caused to sag.

When the receptacle 40 is placed on the rest area 16, the restoring force of the biasing member 100A acts on the bar 98A, biasing the bar 98A in the rotating direction $B_2$. When the weight of the receptacle 40 is not acting on the reels 92A, the bar 98A is rotated in the rotating direction $B_2$ under the restoring force of the biasing member 100A, and the reels 92A coupled to the bar 98A are also rotated in the rotating direction $B_2$ in unison with the bar 98A. Stated otherwise, when the receptacle 40 is placed on the rest area 16, the reels 92A are reversed.

Figures 9A, 9B:
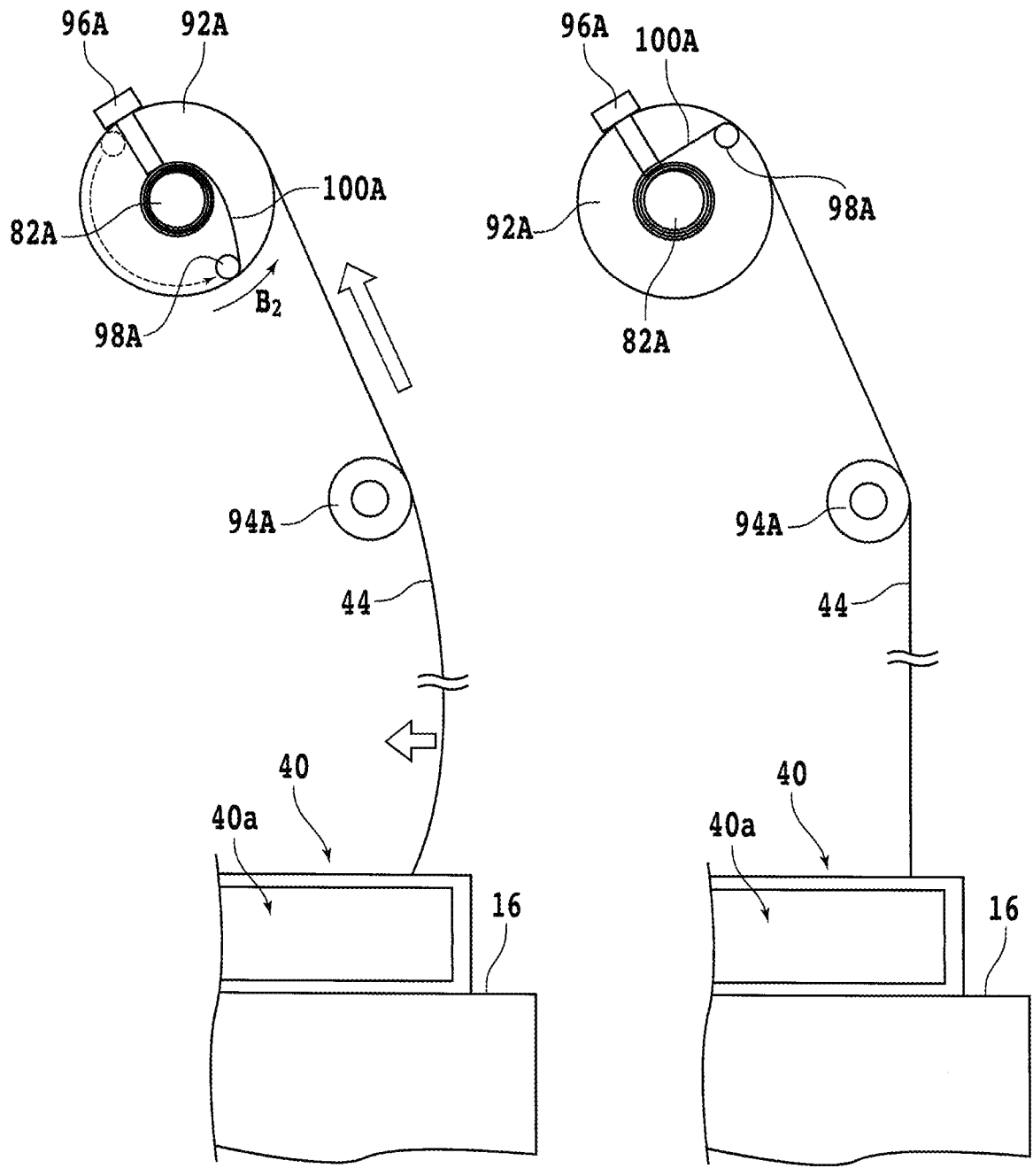
FIG. 9A is a front elevational view of the reel as it is reversed to reel in the suspending member.
FIG. 9B is a front elevational view of the reel at the time when the suspending member is kept taut to eliminate its sag.

FIG. 9A illustrates, in front elevation, the reel 92A as it is reversed to reel in the suspending members 44. When the reels 92A are rotated in the rotating direction $B_2$ by the biasing member 100A, the suspending members 44 are reeled in by the reels 92A. As a result, the sag in the suspending members 44 is automatically eliminated.

FIG. 9B illustrates, in front elevation, the reel 92A at the time when the suspending member 44 is kept taut to eliminate its sag. The characteristics, e.g., a spring constant, of the biasing member 100A are set so as to apply, to the reels 92A, torque that is larger than the weight of the suspending members 44 and smaller than the weight of the receptacle 40. When the receptacle 40 is placed on the rest area 16, the biasing member 100A rotates the reels 92A to reel in the suspending members 44, but keeps the receptacle 40 staying on the rest area 16. Therefore, the receptacle 40 is not raised from the rest area 16 when the reels 92A are reversed.

The biasing member 100B (see FIG. 6) also operates to reverse the reels 92B, thereby eliminating the sag in the suspending members 44 paid out from the reels 92B. The characteristics of the biasing member 100B are set in the same manner as with the characteristics of the biasing member 100A. Then, the workpieces 11 are unloaded from the receptacle 40 placed on the rest area 16. Then, workpieces 11 are loaded into the receptacle 40 placed on the rest area 16.

For lifting the receptacle 40 placed on the rest area 16, the rotational shaft 80a of the electric motor 80 (see FIG. 7) is rotated in the rotating direction A$_2$. The power of the rotational shaft 80a is transmitted to the rod 82A, rotating the rod 82A in the rotating direction B$_2$. The pressers 96A on the rod 82A presses the bar 98A, rotating the reels 92A and the bar 98A in the rotating direction B$_2$. The suspending members 44 coupled to the reels 92A are then reeled in. The power of the rod 82A is transmitted through the joint member 90 to the rod 82B, rotating the rod 82B in the rotating direction C$_2$. The pressers 96B on the rod 82B presses the bar 98B, rotating the reels 92B and the bar 98B in the rotating direction C$_2$. The suspending members 44 coupled to the reels 92B are then reeled in. When the reels 92A and 92B have reeled in the respective suspending members 44, the receptacle 40 is lifted off the rest area 16 and stored back into the storage area 38 in the transport carriage 12 (see FIG. 3A).

After the receptacle 40 has been set back in the transport carriage 12, the transport carriage 12 travels on the transport passageway 10 (see FIG. 1) to transport the workpieces 11 housed in the receptacle 40. While the transport carriage 12 is traveling while carrying the receptacle 40, a force in the rotating direction A$_2$ (see FIG. 7) is applied to the rotational shaft 80a of the electric motor 80 to prevent the suspending members 44 from being paid out from the reels 92A and 92B under the weight of the receptacle 40.

The lifting and lowering unit 42 controls the lifting and lowering of the receptacle 40 as described above. The torque generated by the electric motor 80 varies depending on the workpiece housing state of the receptacle 40. Therefore, the workpiece housing state of the receptacle 40 can be determined on the basis of the torque generated by the electric motor 80.

Figure 10:
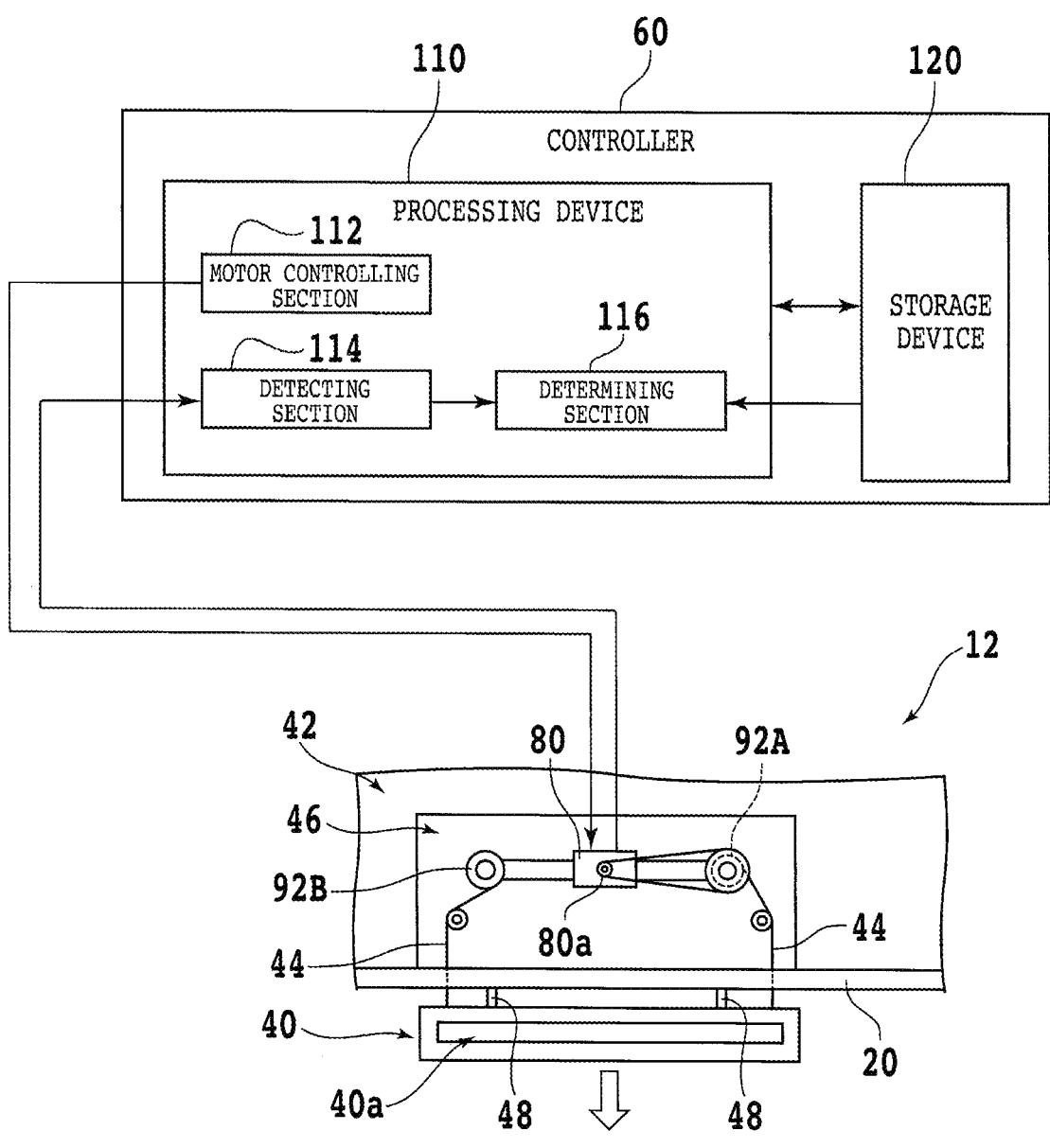
FIG. 10 is a block diagram of a controller.

FIG. 10 illustrates the controller 60 in block form. The workpiece housing state of the receptacle 40 is automatically determined by the controller 60 on the basis of the torque of the electric motor 80. Therefore, the controller 60 functions as a determining unit for determining the workpiece housing state of the receptacle 40. FIG. 10 also schematically illustrates the receptacle 40 and some of the components of the lifting and lowering unit 42 in addition to the functional blocks of the controller 60.

The controller 60 includes a processing device 110 for performing processes required to determine the workpiece housing state of the receptacle 40 and a storage device 120 for storing various pieces of information, e.g., data and programs, used in the processes performed by the processing device 110. The processing device 110 includes a motor controlling section 112 for controlling the electric motor 80, a detecting section 114 for detecting a value commensurate with the torque of the electric motor 80, and a determining section 116 for determining the workpiece housing state of the receptacle 40.

The motor controlling section 112 outputs control signals to the electric motor 80 to control the number of rotations and the rotational speed of the rotational shaft 80a of the electric motor 80 for thereby adjusting the distance by which the receptacle 40 is lifted and lowered and the speed at which the receptacle 40 is lifted and lowered. Specifically, for placing the transport carriage 12 at a transport destination, the motor controlling section 112 outputs a control signal to instruct the electric motor 80 to lower the receptacle 40. The receptacle 40 is now lowered from the transport carriage 12 at a given speed over a given distance until it reaches the transport destination. For carrying the receptacle 40 on the transport carriage 12, the motor controlling section 112 outputs a control signal to instruct the electric motor 80 to lift the receptacle 40. The receptacle 40 is now lifted from the transport destination at a given speed over a given distance until it is stored in the transport carriage 12.

The detecting section 114 that is electrically connected to the electric motor 80 calculates a value, i.e., a torque-commensurate value, commensurate with the torque of the electric motor 80 on the basis of a signal input from the electric motor 80. The torque-commensurate value may represent the value of the torque on the rotational shaft 80a of the electric motor 80 or another value commensurate with the torque on the rotational shaft 80a of the electric motor 80. For example, as the torque on rotational shaft 80a of the electric motor 80 increases, so does the value of an electric current required to be supplied to the electric motor 80 in order to maintain the rotational speed of the rotational shaft 80a. Therefore, the value of the electric current supplied to the electric motor 80 may be used as the torque-commensurate value.

The torque-commensurate value detected by the detecting section 114 is output to the determining section 116. The detecting section 114 may output a torque-commensurate value measured by a sensor incorporated in or connected to the electric motor 80 to the determining section 116, or may calculate a torque-commensurate value based on information, i.e., a signal, input from the electric motor 80 to the detecting section 114 and output the calculated torque-commensurate value to the determining section 116.

A choice is available of various specific processes of measuring the torque-commensurate value. For example, while the receptacle 40 is being stored in the transport carriage 12, the motor controlling section 112 controls the electric motor 80 to pay out the suspending members 44 at a given speed by given lengths. The receptacle 40 stops descending after it has been lowered at the given speed by the given distance. The torque and electric current of the electric motor 80 at the time when the receptacle 40 stops descending is detected as a torque-commensurate value by the detecting section 114. Alternatively, the torque and electric current of the electric motor 80 while the receptacle 40 is being lifted or lowered may be detected as a torque-commensurate value by the detecting section 114.

The determining section 116 determines the workpiece housing state of the receptacle 40 on the basis of the torque-commensurate value input from the detecting section 114. For example, the determining section 116 compares with the torque-commensurate value with a preset reference value, i.e., a threshold value, to determine whether workpieces 11 are housed in the receptacle 40 or not and/or the kinds of workpieces 11 housed in the receptacle 40.

For example, it is assumed that the workpiece unit 17A (see FIG. 5B) housed in the receptacle 40 is smaller in size and weight than the workpiece unit 17B (see FIG. 5B). The torque of the electric motor 80 in a case where the workpiece unit 17A and the workpiece unit 17B are not housed in the receptacle 40 is represented by $T_O$, the torque of the electric motor 80 in a case where only the workpiece unit 17A is housed in the receptacle 40 is represented by $T_A$, the torque of the electric motor 80 in a case where only the workpiece unit 17B is housed in the receptacle 40 is represented by $T_B$, and the torque of the electric motor 80 in a case where the workpiece unit 17A and the workpiece unit 17B are housed in the receptacle 40 is represented by $T_{AB}$. These torques are related to each other as: $T_O < T_A < T_B < T_{AB}$. In other words, the torque of the electric motor 80 is of different values depending on the workpiece housing state of the receptacle 40. Reference values for the torques are established as $T_{ref1}$ ($T_O < T_{ref1} < T_A$), $T_{ref2}$ ($T_A < T_{ref2} < T_B$), $T_{ref3}$ ($T_B < T_{ref3} < T_{AB}$), and stored in the storage device 120 in advance. The determining section 116 then compares the torque T of the electric motor 80 detected by the detecting section 114 with the reference values $T_{ref1}$, $T_{ref2}$, and $T_{ref3}$.

If the torque T of the electric motor 80 is smaller than the reference value $T_{ref1}$, then the determining section 116 determines that no workpiece unit 17 is housed in the receptacle 40. If the torque T of the electric motor 80 is larger than the reference value $T_{ref1}$, then the determining section 116 determines that a workpiece unit 17 is housed in the receptacle 40. In this manner, the determining section 116 determines whether a workpiece unit or units 17, i.e., a workpiece or workpieces 11, are housed in the receptacle 40 or not.

If a workpiece unit or units 17 are housed in the receptacle 40, then the determining section 116 determines the kind and number of the workpiece unit or units 17, i.e., the workpiece or workpieces 11. Specifically, if the torque T of the electric motor 80 is larger than the reference value $T_{ref1}$ and smaller than the reference value $T_{ref2}$, then the determining section 116 determines that only the workpiece unit 17A is housed in the receptacle 40. If the torque T of the electric motor 80 is larger than the reference value $T_{ref2}$ and smaller than the reference value $T_{ref3}$, then the determining section 116 determines that only the workpiece unit 17B is housed in the receptacle 40. If the torque T of the electric motor 80 is larger than the reference value $T_{ref3}$, then the determining section 116 determines that the workpiece unit 17A and the workpiece unit 17B are housed in the receptacle 40.

In a case where the expected workpiece housing state of the receptacle 40 and the actual workpiece housing state of the receptacle 40 are different from each other as a result of the determination by the determining section 116, the controller 60 transmits an error signal via the transmitter 64 (see FIG. 3A) to the controller 14 (see FIG. 2). In this manner, an abnormality of the workpiece housing state of the receptacle 40 on the transport carriage 12 is indicated to the controller 14.

The workpiece housing state of the receptacle 40 may be automatically determined at preset times or may be determined at any time when the controller 14 sends a command for instructing the transport carriage 12 to perform an inspection. For example, the workpiece housing state of the receptacle 40 is inspected immediately before or after the receptacle 40 is stored in the transport carriage 12, while the receptacle 40 is being transported by the transport carriage 12, or immediately before or after the receptacle 40 is placed on the rest area 16 (see FIG. 4). In addition, in the event that the transport carriage 12 comes to an emergency stop due to a failure of the transport system 2 (see FIGS. 1 and 2), the workpiece housing state of the receptacle 40 may be determined before the transport carriage 12 resumes its transport of a workpiece or workpieces 11 after the failure of the transport system 2 has been eliminated. This makes it possible to confirm whether a suitable workpiece or workpieces 11 are stored on the transport carriage 12 before it resumes its transport operation, preventing transport errors from occurring, even when a workpiece or workpieces 11 have been taken into or out of the transport carriage 12 while it is at rest.

As described above, the transport carriage 12 according to the present embodiment has a function to determine of its own accord whether a workpiece or workpieces 11 are housed in the receptacle 40 carried on the transport carriage 12 or not. The function makes it able to avoid continuing to transport a workpiece or workpieces 11 while the workpiece housing state of the receptacle 40 is not appropriate, thereby preventing the efficiency with which to transport workpieces 11 from being lowered.

According to the present embodiment, the sensors 66 detect whether a workpiece or workpieces 11 are housed in the receptacle 40 or not in determining the workpiece housing state of the receptacle 40 (see FIG. 5B). When inspecting the workpiece housing state of the receptacle 40, individual information of a workpiece 11 may be read in addition to detecting the workpiece 11.

Figure 11A:
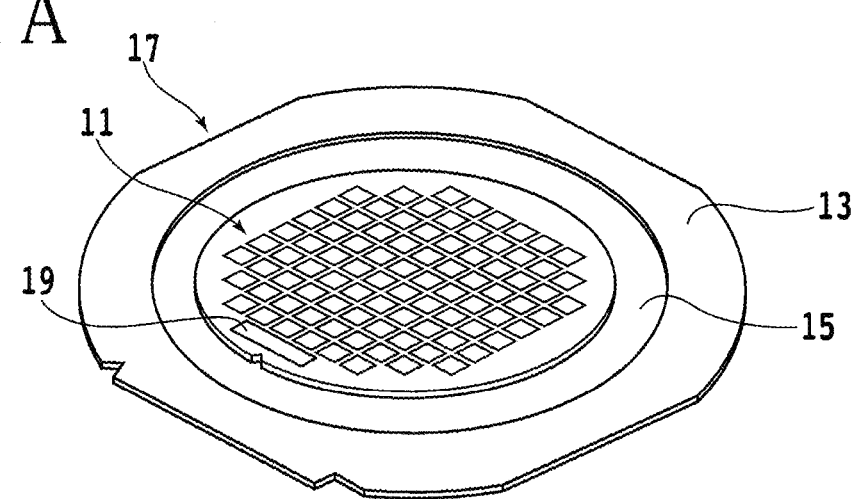
FIG. 11A is a perspective view of a workpiece unit where an individual identification tag is attached to a workpiece.

FIG. 11A illustrates, in perspective, a workpiece unit 17 where an individual identification tag 19 is attached to a workpiece 11. The individual identification tag 19 attached to the workpiece 11 represents individual information, i.e., identification information, of the workpiece 11.

The individual information of the workpiece 11 represents information for identifying the workpiece 11 and includes various pieces of information regarding the workpiece 11, e.g., the shape, material, dimensions, structure, manufacturer, date of manufacture, and processing history of the workpiece 11. The individual identification tag 19 representing the individual information of the workpiece 11 is attached to an outer circumferential portion of the workpiece 11, for example.

The individual identification tag 19 is not limited to any kinds as long as it can record the individual information of the workpiece 11. For example, an individual identification mark such as a character string, i.e., an individual identification (ID), made up of a string of numerals, alphabetical letters, and symbols, for example, a bar code, or a two-dimensional code is applied as the individual identification tag 19 to the workpiece 11. The individual identification mark may be directly printed on the workpiece 11 or a tag such as a seal to which the individual identification mark is applied may be affixed to the workpiece 11. The individual identification tag 19 may include an IC tag or radio-frequency-identification (RFID) tag where the individual information of the workpiece 11 is recorded.

The determining unit 68 (see FIG. 5B) includes a reader, i.e., a reading unit, for reading the individual information of the workpiece 11 from the individual identification tag 19. For example, the sensors 66 may have a function to read the individual information of the workpiece 11 in addition to the function to detect the workpiece 11. In this case, the sensors 66 function as the reader. However, the transport carriage 12 may have a dedicated reader for reading the individual information of the workpiece 11 separately from or independently of the sensors 66.

Any of various readers may be selected depending on the kind of the individual identification tag 19 used. For example, if the individual identification tag 19 is represented by a character string, a bar code, or a two-dimensional code, then an optical-character-recognition (OCR) reader, a bar-code reader, or a two-dimensional-code reader is used as the reader. If the individual identification tag 19 is represented by an IC tag or an RFID tag, then an IC reader or an RFID reader is used as the reader.

For determining the workpiece housing state of the receptacle 40, the sensors 66 detect a workpiece 11 and the reader reads the individual information of the workpiece 11 from the individual identification tag 19. The controller 60 stores the read individual information in the storage device 120 (see FIG. 10) and, if necessary, checks it against registered data to confirm whether a desired workpiece 11 has been housed in the receptacle 40 or not. The reader may read the individual information of the workpiece 11 at any desired time that may be freely set and may not necessarily be the same time as when the sensors 66 detect the workpiece 11. For example, only the individual information of a workpiece 11 may be read immediately after the workpiece 11 has been housed in the receptacle 40.

Figure 11B:
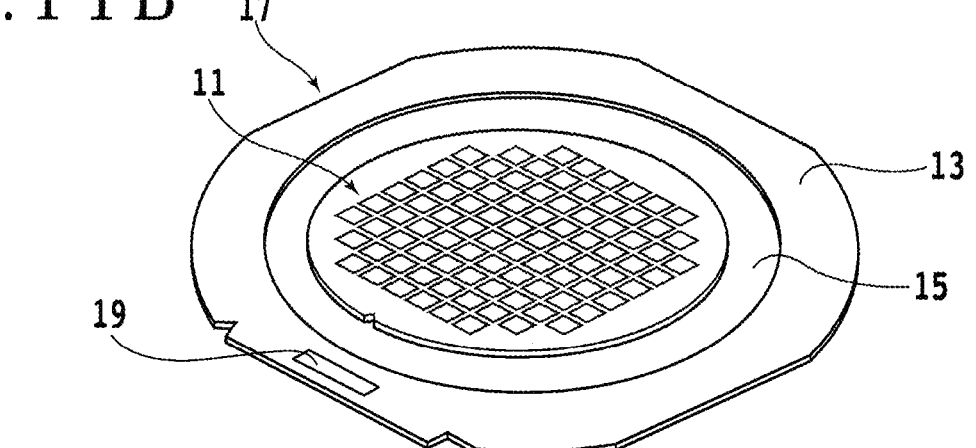
FIG. 11B is a perspective view of a workpiece unit where an individual identification tag is attached to a frame.
Figure 11C:
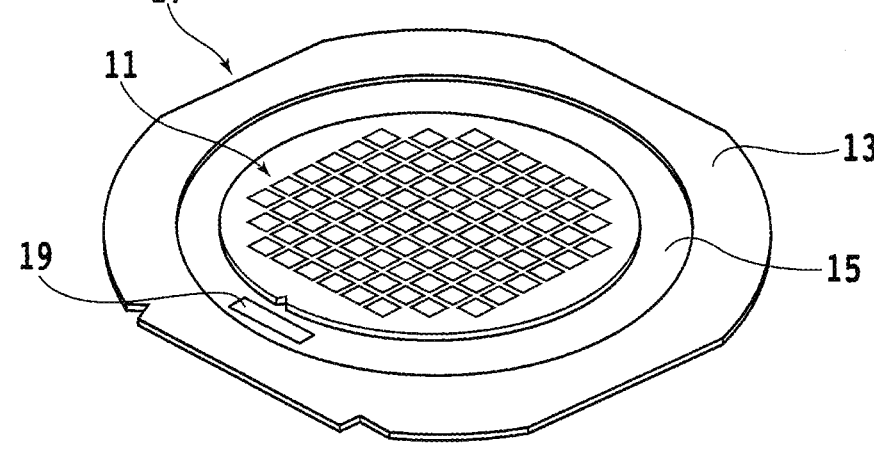
FIG. 11C is a perspective view of a workpiece unit where an individual identification tag is attached to a sheet.

Some workpieces 11 do not have an extra space where an individual identification tag 19 can be attached. In addition, an area of a workpiece 11 where an individual identification tag 19 is attached is processed by way of cutting or laser processing, making it difficult for the reader to read individual information from the individual identification tag 19. For these reasons, an individual identification tag 19 may be attached to the frame 13 or the sheet 15 of a workpiece unit 17. FIG. 11B illustrates, in perspective, a workpiece unit 17 where an individual identification tag 19 is attached to a frame 13. FIG. 11C illustrates, in perspective, a workpiece unit 17 where an individual identification tag 19 is attached to a sheet 15. Even in a case where there is a difficulty in applying an individual identification tag 19 to a workpiece 11, the individual identification tag 19 may be attached to a frame 13 or a sheet 15 to make it possible to read individual information of the workpiece 11 from the individual identification tag 19. Individual identification tags 19 may be attached respectively to a workpiece 11 and a frame 13 or respectively to a workpiece 11 and a sheet 15. Moreover, individual identification tags 19 may be attached respectively to a workpiece 11, a frame 13, and a sheet 15.

The structural and methodological details of the embodiment described above may be changed or modified appropriately without departing from the scope of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A transport carriage for transporting workpieces by traveling on a transport passageway installed over a processing apparatus, the transport carriage comprising:
   a main body frame;
   a receptacle for housing workpieces, wherein said receptacle includes a first workpiece unit and a second workpiece unit, said first workpiece unit having a first size and said second workpiece unit has a second size, wherein said first size and said second size are different;
   a storage area on the main body frame configured for storing the receptacle;
   a lifting and lowering unit attached to the main body frame configured for lifting and lowering the receptacle between the storage area and the processing apparatus; and
   a determining unit for determining whether the workpiece is housed in the receptacle or not.

2. The transport carriage according to claim 1, wherein the determining unit includes a non-contact-type sensor for detecting the workpiece through the receptacle.

3. The transport carriage according to claim 1, wherein
   the lifting and lowering unit includes a suspending member connected to the receptacle for suspending the receptacle, a rotatable reel with the suspending member wound therearound, and an electric motor for controlling rotation of the reel, and
   the determining unit for determining whether the workpiece is housed in the receptacle or not on a basis of torque of the electric motor.

4. The transport carriage according to claim 1, wherein
   an individual identification tag representing individual information of the workpiece is attached to the workpiece, and
   the determining unit reads the individual information from the individual identification tag.

5. The transport carriage according to claim 1, wherein the main body frame includes first sensors mounted on front and rear ends of the main body frame and second sensors mounted on left and right sides of the main body frame, wherein the first sensors and the second sensors each face the transport passageway and are configured to detect marks on the transport passageway to control the movement of the main body frame on the transport passageway.

6. The transport carriage according to claim 1, wherein the main body frame includes third sensors mounted on a front end of the main body frame, the third sensors are configured for detecting an obstacle on the transport passageway.

* * * * *